(12) United States Patent
Saito et al.

(10) Patent No.: US 12,479,965 B2
(45) Date of Patent: Nov. 25, 2025

(54) CROSSLINKED POLYMERIC COMPOSITION AND ITS USE IN ADDITIVE MANUFACTURING

(71) Applicant: UT-Battelle, LLC, Oak Ridge, TN (US)

(72) Inventors: Tomonori Saito, Knoxville, TN (US); Sungjin Kim, Knoxville, TN (US); Md Anisur Rahman, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 391 days.

(21) Appl. No.: 17/982,953

(22) Filed: Nov. 8, 2022

(65) Prior Publication Data
US 2023/0147086 A1    May 11, 2023

Related U.S. Application Data

(60) Provisional application No. 63/277,288, filed on Nov. 9, 2021.

(51) Int. Cl.
*C08J 3/24*    (2006.01)

(52) U.S. Cl.
CPC ............. *C08J 3/24* (2013.01); *C08J 2353/02* (2013.01)

(58) Field of Classification Search
CPC ................................ C08J 3/24; C08J 2353/02
See application file for complete search history.

(56) References Cited

PUBLICATIONS

Bai, Macromolecules, vol. 48, Issue 11, Jun. 9, 2015, pp. 3395-3802. (Year: 2015).*

(Continued)

*Primary Examiner* — Robert C Boyle
(74) *Attorney, Agent, or Firm* — Scully, Scott, Murphy & Presser, P.C.

(57) ABSTRACT

A crosslinked polymeric composition comprising a base polymer containing unconjugated carbon-carbon double bonds of the formula $-CR^a=CR^b-$, wherein a portion of said unconjugated carbon-carbon double bonds in said base polymer are interconnected by a crosslinker (L) as shown in the following structure:

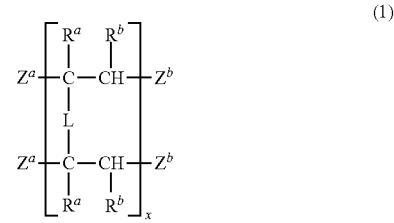

wherein: $R^a$ and $R^b$ are independently selected from hydrogen atom and hydrocarbon groups, wherein $R^a$ and $R^b$ may optionally interconnect to form a ring; x represents the molar percentage of segments that are linked with the linker L throughout the crosslinked polymeric composition; L is a crosslinker having the formula: $-S-R^1-L^a-R^2-L^b-R^1-S-$; $R^1$ and $R^2$ are independently selected from hydrocarbon linking groups containing at least one carbon atom; $L^a$ and $L^b$ independently represent dynamic reversible crosslinking groups; and $Z^a$ and $Z^b$ independently represent remaining portions of the base polymer.

18 Claims, 10 Drawing Sheets

2A    Thiol-ene reaction

2B    Dynamic Imine Formation/Exchange

(56) References Cited

PUBLICATIONS

By Breuillac, Macromolecules 2019, 52, 18, 7102-7113. (Year: 2019).*

Wang, Journal of Polymer Science, Part A, Polymer Chemistry 2016, 54, p. 1357-1366 (Year: 2016).*

Zhang, Journal of Polymer Science, Part A, Polymer Chemistry, 2017, 55, p. 2011-2018. (Year: 2017).*

Appuhamillage, G. A., et al., "3D printed remendable polylactic acid blends with uniform mechanical strength enabled by a dynamic Diels-Alder reaction", Oolym. Chem., 2017, 6 pages, 8, 2087.

Campos, L. M., et al., "Development of Thermal and Photochemical Strategies for Thiol-Ene Click Polymer Functionalization", Macromolecules 2008, pp. 7063-7070, 41.

Chen, Q., et al., "4D Printing via an Unconventional Fused Deposition Modeling Route to High-Performance Thermosets", ACS Appl. Mater. Interfaces 2020, pp. 50052-50060, 12.

Choong, Y. Y. C., et al., "The global rise of 3D printing during the COVID-19 pandemic", Nature Reviews, Sep. 2020, 3 pages, vol. 5.

Christensen, P. R., et al., "Closed-loop recycling of plastics enabled by dynamic covalent diketoenamine bonds", Nature Chemistry, May 2019, pp. 442-448, vol. 11.

Davidson, J. R., et al., "Design Paradigm Utilizing Reversible Diels-Alder Reactions to Enhance the Mechanical Properties of 3D Printed Materials", ACS Appl. Mater. Interfaces, 2016, pp. 16961-16966, 8.

Denissen, W., et al., "Chemical control of the viscoelastic properties of vinylogous urethane vitrimers", Nature Communications, Mar. 2017, 7 pages.

Denissen, W., et al., "Vitrimers: permanent organic networks with glasslike fluidity", Chem. Sci., 2016, 9 pages, 7, 30.

Dhers, S., et al., "A fully bio-based polyimine vitrimer derived from fructose", Green Chem., 2019, 6 pages, 21, 1596.

Eckel, Z. C., et al., "Additive manufacturing of polymer-derived ceramics", Science, Jan. 2016, 10 pages, 351, 58.

Elling, B. R., et al., "Reprocessable Cross-Linked Polymer Networks: Are Associative Exchange Mechanisms Desirable?", ACS Cent. Sci., pp. 1488-1496, 2020, 6.

Erokhin, K. S., et al., "Revealing interactions of layered polymeric materials at solid-liquid interface for building solvent compatibility charts for 3D printing applications", Scientific Reports, 2019, 14 pages, 9, 20177.

European Commission, "A European Strategy for Plastics in a Circular Economy", 2019, 24 pages.

FDA, "FDA-Cleared Sterilants and High Level Disinfectants with General Claims for Processing Reusable Meidcal and Dental Devices", Sep. 2015, 9 pages.

Fujisawa, T., et al., "Cysteamine Suppresses Invasion, Metastasis and Prolongs Survival by Inhibiting Matrix Metalloproteinases in a Mouse Model of Human Pancreatic Cancer", PLoS ONE, Apr. 2012, 10 pages, vol. 7, Issue 4.

Häußler, M., et al., "Closed-loop recycling of polyethylene-like materials", Nature, Feb. 2021, 16 pages, vol. 590, 18.

HM Revenue & Customs, "Plastic Packaging Tax Consultation Document", Publication date Mar. 11, 2020, 51 pages.

Hoyle, C. E., et al., "Thiol-Ene Click Chemistry", Angew. Chem. Int. Ed. 2010, pp. 1540-1573, 49.

Jacob, G. C., et al., "Energy Absorption in Chopped Carbon Fiber Epoxy Composites for Automotive Crashworthiness", Polymer Journal, 2003, pp. 560-567, vol. 35, No. 7.

Kim, S., et al., "Closed-loop additive manufacturing of upcycled commodity plastic through dynamic cross-linking", Sci. Adv., Jun. 2022, 10 pages, 8.

Kim, S., et al., "In situ mechanical reinforcement of polymer hydrogels via metal-coordinated crosslink mineralization", Nature Communications, Jan. 2021, 10 pages.

Lei, X., et al., "Rehealable imide-imine hybrid polymers with full recyclability", J. Mater. Chem. A, 2017, pp. 21140-21145, 5.

Ligon, S. C., et al., "Polymers for 3D Printing and Customized Additive Manufacturing", Chem. Rev. 2017, pp. 10212-10290, 117.

Liu, Y., et al., "Tuning the mechanical and dynamic properties of imine bond crosslinked elastomeric vitrimers by manipulating the crosslinking degree", Polym. Chem., 2020, pp. 1348-1355, 11.

Lowe, A. B., "Thiol-ene "click" reactions and recent applications in polymer and materials synthesis: a first update", Polym. Chem., 2014, pp. 4820-4870, 5.

Luo, J., et al., "Elastic vitrimers: Beyond thermoplastic and thermoset elastomers", Matter, May 4, 2022, pp. 1391-1422, 5.

Macarthur, D. E., "Beyond plastic waste", Science, Nov. 17, 2017, pp. 843, vol. 358, Issue 6365.

Montarnal, D., et al., "Silica-Like Malleable Materials from Permanent Organic Networks", Science, Nov. 2011, 15 pages, 334, 965.

Nadgorny, M., et al., "3D-printing of dynamic self-healing cryogels with tuneable properties", Polym. Chem., 2018, pp. 1684-1692, 9.

Nadgorny, M., et al., "2D and 3D-printing of self-healing gels: design and extrusion of self-rolling objects", Mol. Syst. Des. Eng., 2017, pp. 283-292, 2.

Nair, D. P., et al., "The Thiol-Michael Addition Click Reaction: A Powerful and Widely Used Tool in Materials Chemistry", Chem. Mater. 2014, pp. 724-744, 26.

Niu, W., et al., "Highly Recyclable, Mechanically Isotropic and Healable 3D-Printed Elastomers via Polyurea Vitrimers", ACS Materials Lett. 2021, pp. 1095-1103, 3.

Peez, N. et al., "Quantitative 1H-NMR spectroscopy as an efficient method for identification and quantification of PVC, ABS and PA microparticles", Analyst, 2020, pp. 5363-5371, 145.

Puri, R., et al., "Use of Cysteamine to Treat Metastatic Cancer", Jul. 2013, 1 page.

Qin, Z., et al., "Structural optimization of 3D-printed synthetic spider webs for high strength", Nature Communications, May 2015, 7 pages.

Rottger, M., et al., "High-performance vitrimers from commodity thermoplastics through dioxaborolane metathesis", Science, Apr. 2017, 73 pages, 356, 62.

Ruiz De Luzuriaga, A., et al., "Epoxy resin with exchangeable disulfide crosslinks to obtain reprocessable, repairable and recyclable fiber-reinforced thermoset composites", Mater. Horiz., 2016, pp. 241-247, 3.

Scheutz, G. M., et al., "Adaptable Crosslinks in Polymeric Materials: Resolving the Intersection of Thermoplastics and Thermosets", J. Am. Chem. Soc. 2019, pp. 16181-16196, 141.

Shi, Q., et al., "Recyclable 3D printing of vitrimer epoxy", Mater. Horiz., 2017, 10 pages, 4, 598.

Sigma-Aldrich, IR Spectrum Table & Chart, 2021 20 pages.

Stubbins, A., et al., "Plastics in the Earth system", Science, Jul. 2, 2021, pp. 51-55, 373.

Truby, R. I., et al., "Printing soft matter in three dimensions", Nature, Dec. 15, 2016, pp. 371-378, 540.

Wang, S., et al., "Robust, Fire-Safe, Monomer-Recovery, Highly Malleable Thermosets from Renewable Bioresources", Macromolecules, 2018, pp. 8001-8012, 51.

Yang, Y., et al., "Detecting topology freezing transition temperature of vitrimers by AIE luminogens", Nature Communications, 2019, 8 pages.

Zhang, B., et al., "Reprocessable thermosets for sustainable threedimensional printing", Nature Communications, 2018, 7 pages.

Zheng, J., et al., "Strategies to reduce the global carbon footprint of plastics", Nature Climate Change, May 2019, pp. 374-378, vol. 9, 374.

Zheng, X., et al., "Ultralight, ultrastiff mechanical metamaterials", Science, 2014, 22 pages, 344, 1373.

Zhou, Z., et al., "Synthesis of Vanillin-Based Polyimine Vitrimers with Excellent Reprocessability, Fast Chemical Degradability, and Adhesion", ACS Appl. Polym. Mater. 2020, pp. 5716-5725, 2.

\* cited by examiner

2A  Thiol-ene reaction
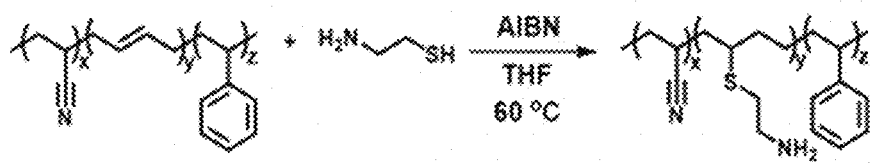
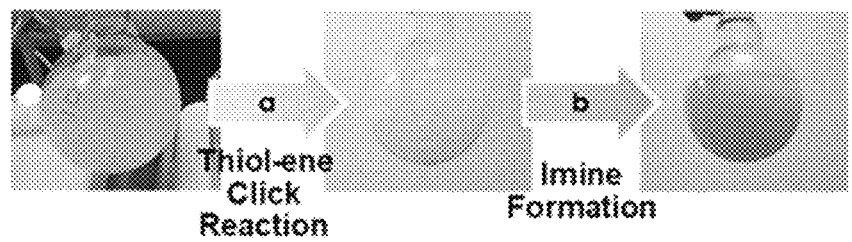
2B  Dynamic Imine Formation/Exchange
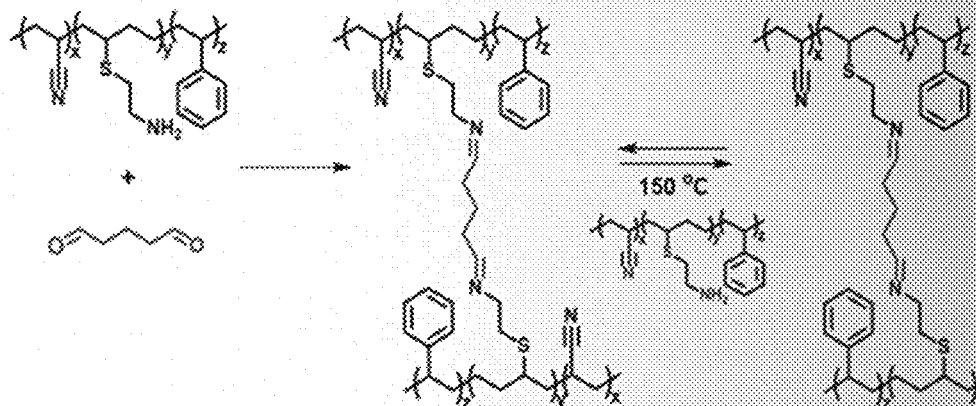
FIGS. 2A-2B

CROSSLINKED POLYMERIC COMPOSITION AND ITS USE IN ADDITIVE MANUFACTURING

CROSS REFERENCE TO RELATED APPLICATION

The present application claims benefit of U.S. Provisional Application No. 63/277,288, filed on Nov. 9, 2021, all of the contents of which are incorporated herein by reference.

STATEMENT REGARDING FEDERALLY SPONSORED RESEARCH

This invention was made with government support under Prime Contract Nos. DE-AC05-00OR22725 and AC02-07CH11358 awarded by the U.S. Department of Energy. The government has certain rights in the invention.

FIELD OF THE INVENTION

The present invention relates generally to polymeric compositions useful as feedstock for additive manufacturing devices, particularly fused deposition modeling (FDM), and fused filament fabrication (FFF). The present invention more particularly relates to crosslinked polymeric compositions, more particularly crosslinked ABS compositions, and their use as feedstock in additive manufacturing.

BACKGROUND OF THE INVENTION

Plastics production (currently>400 Mt/year) and incineration are estimated to account for 16% of the global net carbon emission by 2050, which is a significant surge from 2.3% in 2013 (A. Stubbins et al., Science, 373, 51-55, 2021). Integrative interventions, including increasing the plastics recycling rate and reducing the production demand growth, were simulated to reduce carbon dioxide ($CO_2$) emissions by 93% in the best-case scenario (J. Zheng et al., Nature Climate Change, 9, 374-378, 2019). Thus, establishing a closed loop system for plastics' usage is crucial for achieving net-zero carbon emission. For example, recycling polydiketoenamines with a circular design was reported to emit only ⅟₄₃ of $CO_2$ compared with producing virgin resins without circularity (N. Vora et al., Science Advances, 7(15), 2021). However, the recycling rate of traditional plastics remains low because of the deteriorating properties of plastics upon recycling, as well as added costs (L. T. Korley et al., Science, 373, 66-69, 2021).

Among manufacturing technologies, additive manufacturing (AM) provides on-demand bottom-up 3D material production, which can reduce energy use by 25% and material waste and costs by up to 90% from traditional manufacturing methods (Y. Y. C. Choong et al., Nature Reviews Materials, 5, 637-639, 2020). Therefore, if plastic wastes can be turned into useful 3D structures with better material performance through AM in simple and scalable manners, such an upcycling approach can change the paradigm for the circular plastics economy. In this respect, Fused Filament Fabrication (FFF) is the most accessible and user-friendly AM technology and comprised 69% of the global 3D printing market share in 2018, attributed in large part to the approachable printing protocols of layer-by-layer deposition by extruded fused polymer filaments (S. C. Ligon et al., Chemical Reviews, 117, 10212-10290, 2017). FFF is also scalable to build industry-scale automotive, building, or aircraft parts demonstrated by the Big Area Additive Manufacturing system.

As well known, materials need to be extrudable and printable to be suitable for FFF. Although crosslinked thermosets generally possess highly desirable thermomechanical and chemical properties (FIG. 1A), crosslinked thermosets are generally not extrudable, and thus, not suitable for FFF. Thus, typical polymers used in FFF have been limited to thermoplastics, such as acrylonitrile butadiene styrene (ABS), poly(lactic acid), poly(carbonate), or poly(ethylene terephthalate), which have appropriate viscoelasticity for extrusion-deposition and acceptable mechanical strength before and after printing. Among the thermoplastics, ABS (produced 11.17 Mt/year, 2018) is one of the most widely used FFF-printable polymers with wide-ranging applications from auto parts to table tennis balls and LEGO blocks, owing to its thermomechanical toughness, rigidity, and cost-effectiveness. If discarded commodity thermoplastics, such as ABS, can be upcycled into materials with suitable or enhanced mechanical-chemical properties and (re)printability in desired 3D structures, such a process would represent a significant advance in the effort to recycle waste plastic and produce parts with greater mechanical strength or toughness than currently possible using FFF.

SUMMARY OF THE INVENTION

The present disclosure is directed to upcycling of unsaturated thermoplastics, such as acrylonitrile butadiene styrene (ABS), into a recyclable and robust dynamic covalent network (ABS-vitrimer), which is advantageously useful as a feedstock material in FFF. The vitrimer exhibits mechanical robustness and chemical resistance by virtue of its covalent network formation, but it can also be malleable by reconfiguring reversible crosslinks through dynamic bond exchange at elevated temperature, making it recyclable. The associative bond exchange between the vitrimer layers upon printing improves the weak inter-filament bonding and solvent resistance of the FFF-printed structures. The FFF of upcycled ABS-vitrimers fulfills the intertwined thermomechanical-chemical-environmental needs for circular plastics manufacturing. The full FFF-processing of ABS-vitrimer overcomes the major challenge of (re)printing crosslinked materials and produces stronger, tougher, solvent-resistant 3D objects directly reprintable and separatable from unsorted plastic waste. The process is not only effective in recycling of unsaturated thermoplastics, such as ABS, but advantageously modifies the recycled thermoplastic to have the properties of a crosslinked thermoset, yet is completely extrudable and printable by virtue of the dynamic covalent crosslinks present after modification of the recycled thermoplastic by the present process.

In one aspect, the present disclosure is directed to a crosslinked (vitrimer) polymeric composition that has characteristics of a thermoset but yet is sufficiently extrudable so as to function as a feedstock in an AM (e.g., FFF) process. The crosslinked polymeric composition includes a base polymer containing unconjugated carbon-carbon double bonds of the formula —$CR^a$=$CR^b$—, wherein a portion of the unconjugated carbon-carbon double bonds in the base polymer are interconnected by a crosslinker (L) as shown in the following structure:

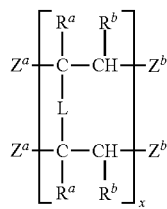

(1)

wherein $R^a$ and $R^b$ are independently selected from hydrogen atom and hydrocarbon groups (typically containing 1-6 carbon atoms, but can be substantially larger, including polymeric) wherein, in the case where $R^a$ and $R^b$ are both hydrocarbon groups, said hydrocarbon groups optionally interconnect to form a ring; 2x represents the molar percentage of segments that are linked with the linker L among all other segments throughout the crosslinked polymeric composition; L is a crosslinker having the formula: —S—$R^1$-$L^a$-$R^2$-$L^b$-$R^1$—S—; $R^1$ and $R^2$ are independently selected from hydrocarbon linking groups (typically containing 1-12 carbon atoms, but can be substantially longer, including polymeric); $L^a$ and $L^b$ independently represent dynamic reversible crosslinking groups; and $Z^a$ and $Z^b$ independently represent remaining portions of the base polymer. The base polymer may be, for example, acrylonitrile-butadiene-styrene, styrene-butadiene-styrene, styrene-butadiene, acrylonitrile-butadiene, polybutadiene, polyisoprene, polynorbornene, and poly(aryl glycidyl ether) polymers, wherein $Z^a$ and $Z^b$ represent remaining portions of any of the foregoing base polymers. In some embodiments, x or 2x represents the molar percentage of unconjugated carbon-carbon double bonds that are linked with the linker L throughout the crosslinked polymeric composition.

In another aspect, the present disclosure is directed to a method of producing a crosslinked polymeric composition that includes the following steps:
  (i) providing a base polymer containing unconjugated carbon-carbon double bonds of the formula —$CR^a$=$CR^b$—, wherein $R^a$ and $R^b$ are independently selected from hydrogen atom and hydrocarbon groups (typically containing 1-6 carbon atoms, but can be substantially longer, including polymeric) wherein, in the case where $R^a$ and $R^b$ are both hydrocarbon groups, the hydrocarbon groups optionally interconnect to form a ring;
  (ii) reacting a portion of the unconjugated carbon-carbon double bonds with thiol-containing molecules of the formula HS—$R^1$—X under conditions that promote a thiol-ene reaction, wherein $R^1$ is a hydrocarbon linking group (typically containing 1-12 carbon atoms, but can be substantially longer, including polymeric) and X is a crosslinkable reactive group, to form the following intermediate (a):

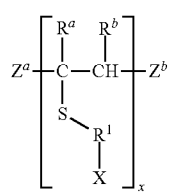

(a)

wherein $Z^a$ and $Z^b$ independently represent remaining portions of the base polymer and x represents the molar percentage of segments that are attached to —S—$R^1$—X throughout the base polymer (in some embodiments, x represents the molar percentage of unconjugated carbon-carbon double bonds that are attached to —S—$R^1$—X among all other segments throughout the base polymer); and
  (iii) crosslinking between X groups of intermediate (a) species with a crosslinker of the formula $Y^a$—$R^2$—$Y^b$, wherein $R^2$ is a hydrocarbon linking group (typically containing 1-12 carbon atoms, but can be substantially longer, including polymeric) and $Y^a$ and $Y^b$ are reactive with X to result in the following structure:

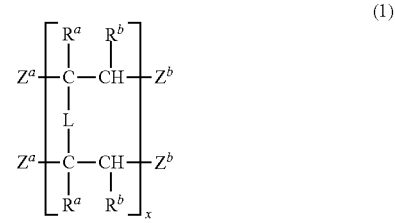

(1)

wherein L has the formula —S—$R^1$—X—$Y^a$—$R^2$—$Y^b$—X—$R^1$—S—; $R^2$ is a hydrocarbon linking group (typically containing 1-12 carbon atoms, but can be substantially longer, including polymeric); 2x represents the molar percentage of segments that are linked with the linker L throughout the crosslinked polymeric composition; X—$Y^a$ represents a dynamic reversible crosslinking group resulting from a reaction between a reactive group X and reactive group $Y^a$; and X—$Y^b$ represents a dynamic reversible crosslinking group resulting from a reaction between a reactive group X and reactive group $Y^b$. In some embodiments, x or 2x represents the molar percentage of unconjugated carbon-carbon double bonds that are linked with the linker L throughout the crosslinked polymeric composition In another aspect, the present disclosure is directed to a method of producing an object by additive manufacturing, such as FFF, wherein the method includes the following steps: (i) incorporating a crosslinked polymer feed material into an additive manufacturing device, wherein the crosslinked polymer feed material is the crosslinked polymeric composition of Formula (1); and (ii) melting and extruding the crosslinked polymer feed material through a die of the additive manufacturing device and repeatedly depositing discrete amounts of a melted form of the crosslinked polymer feed material through the die to build a solid object layer-by-layer, and permitting the layers to cool and harden to form a solid object constructed of the crosslinked polymer feed material.

BRIEF DESCRIPTION OF THE FIGURES

FIG. 1A is a schematic diagram comparing characteristics of traditional thermoplastics, thermosets, and vitrimers. FIG. 1B is a schematic illustration of the circular design of upcycling thermoplastics to FFF-(re)printable vitrimer. Dynamic covalent crosslinks in the vitrimer readily rearrange to permit FFF-(re)printing at high temperature while enhancing interfilament strength and solvent-stability of printouts. The photographs show structures printed from the untreated ABS (Neat-ABS) (left) and the ABS-vitrimer (right) of a building (top) and an oak leaf before (middle) and after (bottom) immersion in tetrahydrofuran (THF) for 48 hours. The ABS-vitrimer preserved its structure whereas the Neat-ABS completely dissolved. Thus, ABS-vitrimer and Neat-ABS can be recycled through separation and dissolution-precipitation, respectively, from their waste mixture solution, wherefrom the dissolved Neat-ABS can be re-upcycled into ABS-vitrimer FIGS. 2A-2C. Chemical upcycling pathway to synthesize ABS with dynamic imine crosslinks and their tailored mechanical properties. FIG. 2A includes a schematic (top) and accompanying photographs of the reaction medium (bottom) for the reaction in which Neat-ABS was modified to contain amine groups via thiol-ene reaction of cysteamine with butadiene groups at 60° C. by using azobisisobutyronitrile (AIBN) or photoinitiator as the initiator. FIG. 2B is a schematic showing how the modified ABS underwent the imine formation reaction with glutaraldehyde in the solution state, dried, and then cured at 150° C.

FIG. 4A is a schematic showing the (re)processability of ALD-33. ALD-33 can be hot-pressed into a film at 150° C., shaped as desired, broken apart, and repressed into a film at 150° C. FIG. 3B is a graph showing rheological behavior at 150° C. of Neat-ABS and ALD-33 characterized by frequency sweep at 1% strain from small-angle oscillatory shear test and time—temperature superposition (measured 130-170° C. with 10° C. intervals, reference T=150° C.).

FIG. 3C is a graph showing Arrhenius relation from obtained relaxation time (τ) from stress-relaxation profiles of ALD-33. The deduced $E_a$ is ~151 kJ/mol. FIG. 3D is a graph showing dynamic mechanical analysis (DMA) of ALD-33 films upon three recycles (re 1-3) in oscillation temperature increase from 35 to 130° C. (amplitude: 20 frequency: 1 Hz, T ramp rate: 3° C./minute). Note that meaningful measurements above 130° C. were unavailable using the apparatus configurations because of sample deformation of ABS systems. FIG. 3E is a graph showing the loss factor (tan δ=E"/E') recorded via the measurement in FIG. 3D.

FIGS. 4A-4M. FFF of ABS-vitrimers. FIG. 4A shows a computer-aided design (CAD) of a single-layered dog-bone tensile specimen printed in the transverse path. FIGS. 4B and 4C are graphs showing tensile stress-strain curves (FIG. 4B) and UTS (FIG. 4C) of the transverse-printed specimens made of Neat-ABS and ALD-33. FIG. 4D shows a CAD of longitudinal-printed specimens. FIGS. 4E and 4F are graphs showing tensile stress-strain curves (FIG. 4E) and UTS (FIG. 4F) of the longitudinal-printed specimens. FIG. 4G shows scanning electron microscopy (SEM) images showing edges of the transverse-printed specimens. FIG. 4H are time lapsed photographs showing solvent-resistance of an FFF-printed oak leaf structure (0.3 g) over 24 hours in THF (10 mL) at room temperature. The blue Neat-ABS was used for better visual comparison. FIG. 4I are photographs showing separation of ABS-vitrimer from its unsorted waste mixture with Neat-ABS and Styrofoam by dissolution in THF followed by decanting. FIG. 4J shows the wastes of Neat-ABS, ABS-vitrimer, or their blends upcycled into 3D-printed baskets with different colors by iterating the same FFF protocols. FIG. 4K is a graph containing compressive force-displacement curves of the unit mass ($F_{load}/m_{specimen}$) of beetles' forewing-inspired structures (showing on right) printed from Neat-ABS and ALD-33. FIG. 4L is a graph plotting specific energy absorption (SEA) at the displacement of ~0.4 mm in FIG. 4K. FIG. 4M is a graph plotting yielding $F_{load}/m_{specimen}$ at the displacement of ~0.4 mm in FIG. 4K. The shaded area indicates the typical SEA range of a fully filled structure of Neat-ABS. The error bars indicate standard deviations from triplicate measurements.

DETAILED DESCRIPTION OF THE INVENTION

Figures 1A, 1B:
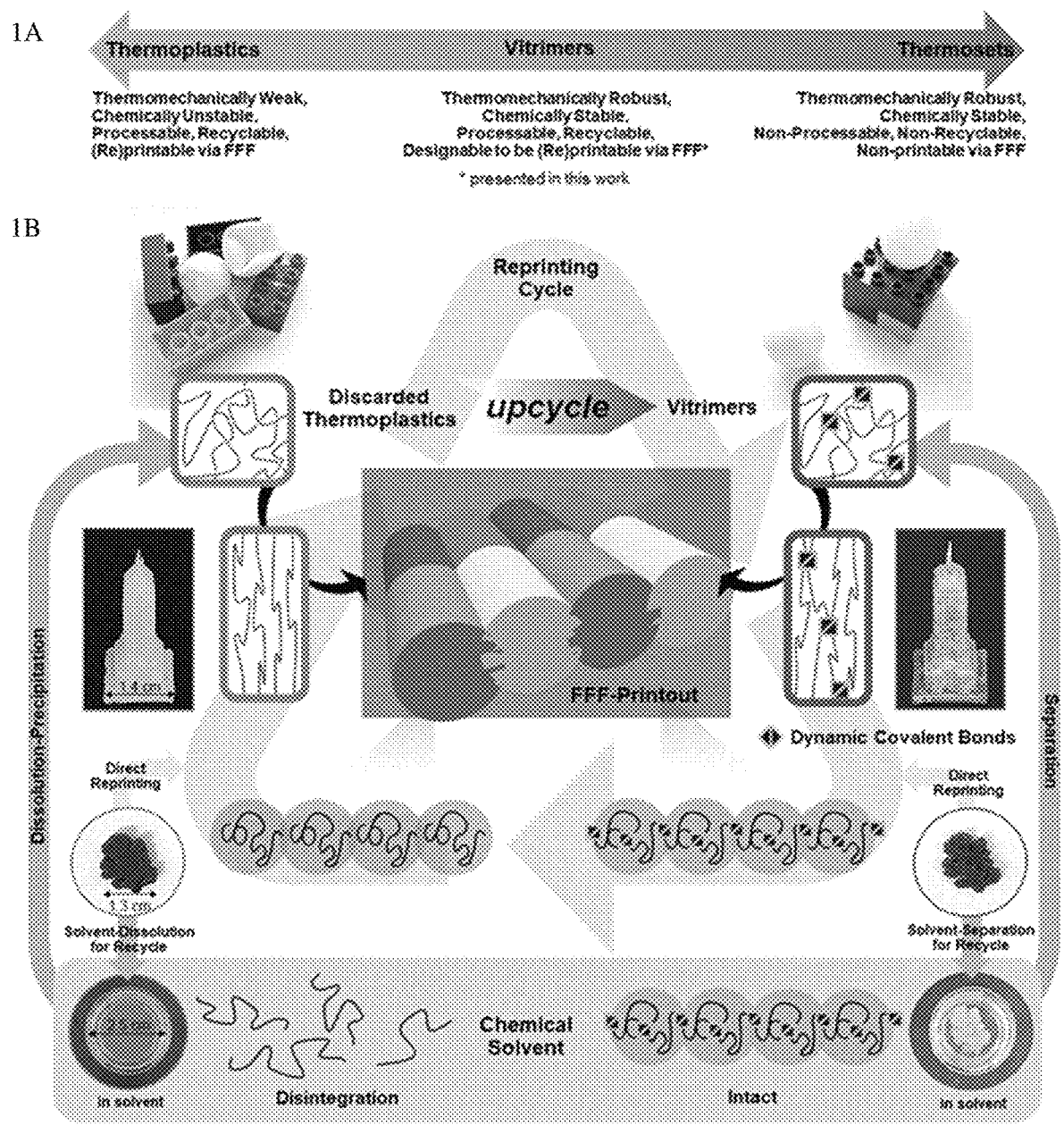
FIGS. 1A-1B. Circular model design of upcycling thermoplastics into recyclable vitrimer for FFF.

In a first aspect, the present disclosure is directed to crosslinked polymeric compositions containing a base polymer containing unconjugated carbon-carbon double bonds of the formula —$CR^a$=$CR^b$—, wherein at least a portion of the unconjugated carbon-carbon double bonds in the base polymer are interconnected by a crosslinker (L). The crosslinker (L) crosslinks between unconjugated carbon-carbon double bonds of the formula —$CR^a$=$CR^b$— in the base polymer as shown in the following structure:

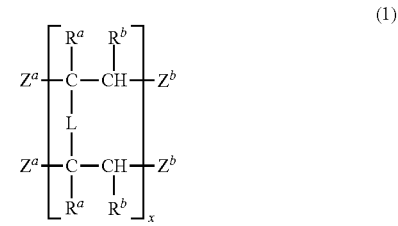

At least a portion of the unconjugated carbon-carbon double bonds in the base polymer are interconnected by a crosslinker (L). The term "at least a portion" typically corresponds to a mole percentage (x) of at least 1%, 2%, 5%, 10%, 15%, or 20% and up to 30%, 40%, 50%, 60%, 70%, 80%, 90%, 95%, or 100% of the carbon-carbon double bonds. The term "at least a portion" may also correspond to a value within a range bounded by any two of the foregoing values, e.g., 1-100%, 1-90%, 1-80%, 1-70%, 1-60%, 1-50%, 2-100%, 2-90%, 2-80%, 2-70%, 2-60%, 2-50%, 5-100%, 5-90%, 5-80%, 5-70%, 5-60%, 5-50%, 5-40%, 5-40%, 5-30%, 5-20%, or 5-10% of the carbon-carbon double bonds. The variable 2x represents the molar percentage of segments that are linked with the linker L among all other segments throughout the crosslinked polymeric composition. Thus, x or 2x can be any of the foregoing values or a range therein. Notably, the variable x does not indicate a block of x units containing the linker L, although in some embodiments this may be the case. In some embodiments, x or 2x represents the molar percentage of unconjugated carbon-carbon double bonds that are linked with the linker L throughout the crosslinked polymeric composition.

The base polymer may be selected from, for example, acrylonitrile-butadiene-styrene (ABS), styrene-butadiene-styrene (SBS), styrene-butadiene, acrylonitrile-butadiene, polybutadiene, polyisoprene (e.g., cis- or trans-polyisoprene), polynorbornene, and poly(aryl glycidyl ether) polymers. In some embodiments, the base polymer contains a polybutadiene block, and may be a homopolymer or block copolymer. The polymer containing a polybutadiene block may be, for example, ABS, styrene-butadiene, acrylonitrile-butadiene, or polybutadiene.

The variables $R^a$ and $R^b$ are independently selected from hydrogen atom and hydrocarbon groups. In the case where $R^a$ and/or $R^b$ are hydrocarbon groups, the hydrocarbon group may independently contain 1-6 carbon atoms or they may contain a substantially higher number of carbon atoms, e.g., at least or above 7, 8, 9, 10, 11, 12, 15, 18, 24, or 30, and even polymeric groups. In some embodiments, the hydrocarbon group, in each instance, may contain 1, 2, 3, 4, 5, or 6 carbon atoms or a number of carbon atoms within a range bounded by any two of these numbers (e.g., 1-6, 1-5, 1-4, 1-3, or 1-2 carbon atoms). The hydrocarbon group may be a linear or branched alkyl or alkenyl group or an aliphatic or aromatic cyclic group. Some examples of linear alkyl groups containing 1-6 carbon atoms include methyl, ethyl, n-propyl, n-butyl, n-pentyl, and n-hexyl groups. Some examples of linear alkenyl groups containing 2-6 carbon atoms include vinyl and allyl groups. Some examples of branched alkyl groups containing 3-6 carbon atoms include isopropyl, isobutyl, sec-butyl, t-butyl, isopentyl, and iso-hexyl groups. Some examples of branched alkenyl groups containing 3-6 carbon atoms include propen-2-yl, 2-methyl-2-propen-1-yl and 2-methyl-2-buten-1-yl. Some examples of aliphatic cyclic groups containing 3-6 carbon atoms include cyclopropyl, cyclobutyl, cyclobutenyl, cyclopentyl, cyclopentenyl, cyclohexyl, cyclohexenyl, and cyclohexadienyl. An example of an aromatic cyclic group includes phenyl. In some embodiments, $R^a$ and $R^b$ are both hydrogen (H) atoms. In other embodiments, $R^a$ is a hydrogen atom while $R^b$ is a hydrocarbon group containing 1-6 carbon atoms, or $R^b$ is a hydrogen atom while $R^a$ is a hydrocarbon group containing 1-6 carbon atoms. In other embodiments, $R^a$ and $R^b$ are both hydrocarbon groups containing 1-6 carbon atoms. In the case where $R^a$ and $R^b$ are both hydrocarbon groups, the hydrocarbon groups optionally interconnect to form a ring. For example, $R^a$ and $R^b$ may be selected as ethyl groups and interconnected to form a cyclohexyl ring.

The variables $Z^a$ and $Z^b$ independently represent remaining portions of the base polymer. Notably, $Z^a$ and $Z^b$ may function to link between crosslinked portions subtended by x, and/or $Z^a$ and $Z^b$ may function as terminal groups in the crosslinked polymer composition. Typically, a large number of $Z^a$ and $Z^b$ are repeated as linking and/or terminating portions throughout the crosslinked polymer. For example, if the base polymer is ABS, $Z^a$ and $Z^b$ may independently represent one of or a combination of two or more of: (i) methylene (—$CH_2$—) linkers (and optionally, vinyl linkages if not crosslinked by L) resulting from polymerized butadiene units, segments, or blocks; (ii) polymerized acrylonitrile units, segments, or blocks; and (iii) polymerized styrene units, segments, or blocks. As another example, if the base polymer is styrene-butadiene, $Z^a$ and $Z^b$ may independently represent one of or a combination of: (i) methylene (—$CH_2$—) linkers resulting from polymerized butadiene units, segments, or blocks; and (ii) polymerized styrene units, segments, or blocks. As another example, if the base polymer is acrylonitrile-butadiene, $Z^a$ and $Z^b$ may independently represent one of or a combination of: (i) methylene (—$CH_2$—) linkers resulting from polymerized butadiene units, segments, or blocks; and (ii) polymerized acrylonitrile units, segments, or blocks. As another example, if the base polymer is polybutadiene, $Z^a$ and $Z^b$ may represent methylene (—$CH_2$—) linkers (and optionally, vinyl linkages if not crosslinked by L) resulting from polymerized butadiene units, segments, or blocks.

The crosslinker (L) has the formula —S—$R^1$-$L^a$-$R^2$-$L^b$-$R^1$—S—, wherein $R^1$ and $R^2$ are independently selected from hydrocarbon linking groups. The hydrocarbon linking groups may independently contain 1-12 carbon atoms, or they may contain a substantially higher number of carbon atoms, e.g., at least or above 7, 8, 9, 10, 11, 12, 15, 18, 24, or 30, and even polymeric groups. The variables $L^a$ and $L^b$ independently represent dynamic reversible crosslinking groups; and S represents a sulfur atom (sulfide) linker. Some examples of dynamic reversible crosslinking groups include imine (—C=N—) bonds, boronic ester bonds, disulfide bonds, ester bonds, urea bonds, silyl ether bonds, vinylogous urethane, and urethane bonds. In some embodiments, $L^a$ and $L^b$ are independently selected from any of the foregoing dynamic reversible crosslinking groups. Typically, $L^a$ and $L^b$ are the same, but in some embodiments, $L^a$ and $L^b$ may be different. In particular embodiments, one or both of $L^a$ and $L^b$ are or include imine (—C=N—) bonds.

In some embodiments, $R^1$ and $R^2$ are hydrocarbon linking groups selected from linear or branched alkyl or alkenyl linking groups or aliphatic or aromatic cyclic linking groups. In some embodiments, $R^1$ and $R^2$ are independently selected from alkyl linking groups of the formula —$(CH_2)_n$—, wherein n is independently an integer of 1-30, 1-20, 1-18, or 1-12 for each of $R^1$ and $R^2$, and one or more H atoms in the foregoing formula may be substituted by a methyl or ethyl group. In different embodiments, $R^1$ is a hydrocarbon linking group (or more particularly, alkyl or alkenyl linking group) containing 1, 2, 3, 4, 5, 6, 7, 8, 9, 10, 11, or 12 carbon atoms or a number of carbon atoms within a range bounded by any two of the foregoing values. Independent of $R^1$, in different embodiments, $R^2$ is a hydrocarbon linking group (or more particularly, alkyl or alkenyl linking group) containing 1, 2, 3, 4, 5, 6, 7, 8, 9, 10, 11, or 12 carbon atoms or a number of carbon atoms within a range bounded by any two of the foregoing values.

In some embodiments, the base polymer contains a polybutadiene block, in which case the crosslinked polymeric composition may have the following structure:

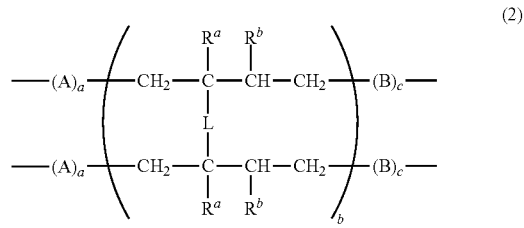

In Formula (2), $R^a$, $R^b$, and L are as defined above. The subscript b (or 2×b, i.e., 2b) corresponds to the number (or molar percentage) of butadiene units in the polybutadiene block or in the entire polymer, wherein all or a portion of the butadiene units may be crosslinked by L. In some embodiments, butadiene units crosslinked by L may all be directly connected to each other with no uncrosslinked butadiene units remaining. In other embodiments, some uncrosslinked butadiene units may remain between crosslinked butadiene units. The subscript b (or 2b) is typically a molar percentage of at least 1%, 10%, 20%, 30%, 40%, 50%, or 100%. The variables A and B represent other polymerized units (for example, acrylonitrile, styrene, or combination thereof) that may or may not be present. The subscripts a and c independently represent 0 or an integer of at least 1%, 10%, 20%, 30%, 40%, 50%, or 100%. Thus, when subscripts a and/or c are greater than 1, then $(A)_a$ and/or $(B)_c$ represent polymerized blocks (i.e., "a" number of A polymerized units and "c" number of B polymerized units).

In another aspect, the present disclosure is directed to a method of producing a crosslinked polymer composition as described above. The crosslinked polymer composition may be as depicted in Formula (1) or (2).

In a first step of the method, a base polymer containing unconjugated carbon-carbon double bonds of the formula $—CR^a=CR^b—$ is provided. The base polymer may be any of the polymers containing unconjugated carbon-carbon double bonds provided earlier above. The first step may or may not include synthesizing the base polymer. In some embodiments, the base polymer used in the first step is waste polymer, such as waste ABS. In other embodiments, the base polymer used in the first step is virgin (fresh) polymer, which may be synthesized or obtained from a commercial source in the first step.

In a second step of the method, at least a portion (or a portion) of the unconjugated carbon-carbon double bonds in the base polymer are reacted with thiol-containing molecules of the formula $HS—R^1—X$ under conditions that promote a thiol-ene reaction, wherein $R^1$ is a hydrocarbon linking group typically containing 1-12 carbon atoms, but can be substantially longer, including polymeric, and X is a crosslinkable reactive group. The reaction results in an intermediate (a) having the following structure:

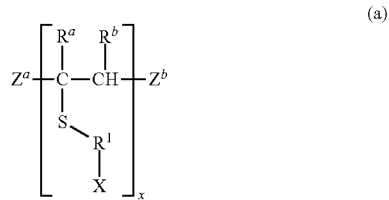

(a)

In intermediate (a), $R^a$ and $R^b$ are as defined above, $Z^a$ and $Z^b$ independently represent remaining portions of the base polymer, as described above, and x represents the molar percentage of segments (or alternatively, x represents the molar percentage of unconjugated carbon-carbon double bonds) that are attached to $—S—R^1—X$ throughout the base polymer, as described above.

In the case where the base polymer contains a polybutadiene block, the intermediate (a) may have the following structure:

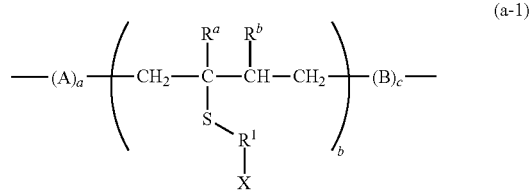

(a-1)

In intermediate (a-1), $R^a$, $R^b$, $R^1$, and X are as defined above. The subscript b corresponds to the number (or molar percentage) of butadiene units in the polybutadiene block or over the whole polymer, wherein all or a portion of the butadiene units may be attached to the $—S—R^1—X$ group.

In some embodiments, butadiene units attached to the $—S—R^1—X$ group may all be directly connected to each other with no unreacted butadiene units remaining. In other embodiments, some unreacted butadiene units may remain between reacted butadiene units. The subscript b is typically a molar percentage of at least 1%, 10%, 20%, 30%, 40%, 50%, or 100%. The variables A and B represent other polymerized units (for example, acrylonitrile, styrene, or combination thereof) that may or may not be present. The subscripts a and c independently represent 0 or an integer of at least 1%, 10%, 20%, 30%, 40%, 50%, or 100%. Thus, when subscripts a and/or c are greater than 1, then $(A)_a$ and/or $(B)_c$ represent polymerized blocks (i.e., "a" number of A polymerized units and "c" number of B polymerized units).

In a third step of the method, X groups of the intermediate (a) or (a-1) are reacted and crosslinked with a crosslinker of the formula $Y^a—R^2—Y^b$, wherein $R^2$ is a hydrocarbon linking group typically containing 1-12 carbon atoms, but may be substantially larger, such as by having a number of carbon atoms of, e.g., at least or above 15, 18, 24, or 30, and may even be a polymeric linking group; and $Y^a$ and $Y^b$ are functional groups reactive with X to result in the structure of Formula (1) or (2) shown earlier above. More specifically, crosslinking of X in intermediate (a) with the crosslinker of the formula $Y^a—R^2—Y^b$ results in the crosslinked structure of Formula (1), while crosslinking of X (e.g., an amine or diol or other group as defined elsewhere in this disclosure) in intermediate (a-1) with the crosslinker of the formula $Y^a—R^2—Y^b$ (where $Y^a$ and $Y^b$ may be an aldehyde, acac, boronic ester, or other group reactive with X, as further defined elsewhere in this disclosure) results in the crosslinked structure of Formula (2). Reacting either intermediate with the crosslinker of the formula $Y^a—R^2—Y^b$, results in the larger crosslinker (L) as shown in Formulas (1) and (2).

As note above for Formulas (1) and (2), the crosslinker (L) has the formula $—S—R^1-L^a-R^2-L^b-R^1—S—$, wherein $R^1$ and $R^2$ are independently selected from hydrocarbon linking groups, typically containing 1-12 carbon atoms, but may contain a substantially higher number of carbon atoms, e.g., at least or above 15, 18, 24, or 30, and even polymeric linking groups; $L^a$ and $L^b$ independently represent dynamic reversible crosslinking groups; and S represents a sulfur atom (sulfide) linker. After reaction between X and crosslinker of the formula $Y^a—R^2—Y^b$, the crosslinker L can be alternatively expressed as $—S—R^1—X—Y^a—R^2—Y^b—X—R^1—S—$, wherein $X—Y^a$ represents a dynamic reversible crosslinking group resulting from a reaction between a reactive group X and reactive group $Y^a$, and wherein $X—Y^a$ corresponds to $L^a$; and similarly, wherein $X—Y^b$ represents a dynamic reversible crosslinking group resulting from a reaction between a reactive group X and reactive group $Y^b$, and wherein $X—Y^b$ corresponds to $L^b$. As provided above for $L^a$ and $L^b$, some examples of dynamic reversible crosslinking groups (for $X—Y^a$ and $X—Y^b$) include imine ($—C=N—$) bonds, boronic ester bonds, disulfide bonds, ester bonds, urea bonds, silyl ether bonds, vinylogous urethane, and urethane bonds. In particular embodiments, one or both of $X—Y^a$ and $X—Y^b$ are or include imine bonds or vinylogous urethane bonds.

To result in $X—Y^a$ and/or $X—Y^b$ being imine ($—C=N—$) bonds, X may be an amine ($NH_2$) group and $Y^a$ and/or $Y^b$ may be aldehyde groups before reacting to form $X—Y^a$ and/or $X—Y^b$ imine bonds. In the case where $Y^a$ and $Y^b$ are both aldehyde groups, $Y^a—R^2—Y^b$ is a dialdehyde, which may have the formula $HC(O)(CH_2)_vC(O)H$, where v may be an integer of 1-12, as indicated above for $R^2$. To result in X—$Y^a$ and/or X—$Y^b$ being boronic ester bonds, X may be a boronic ester group or diol group and $Y^a$ and/or $Y^b$ may be alcohol, diol, or boronic ester groups before reacting to form X—$Y^a$ and/or X—$Y^b$ boronic ester bonds. To result in X—$Y^a$ and/or X—$Y^b$ being disulfide bonds, X, $Y^a$, and $Y^b$ may all be thiol (SH) groups before reacting to form X—$Y^a$ and/or X—$Y^b$ disulfide bonds, or alternatively, one of X, $Y^a$, and $Y^b$ may already contain a disulfide linkage. To result in X—$Y^a$ and/or X—$Y^b$ being ester (i.e., carboxy ester) bonds, X may be a carboxylic acid group and $Y^a$ and/or $Y^b$ may be alcohol or diol groups before reacting to form X—$Y^a$ and/or X—$Y^b$ ester bonds; or conversely, X may be an alcohol or diol group and $Y^a$ and/or $Y^b$ may be carboxylic acid groups before reacting to form X—$Y^a$ and/or X—$Y^b$ ester bonds. To result in X—$Y^a$ and/or X—$Y^b$ being urethane (carbamate) bonds, X may be an isocyanate (—NCO) group and $Y^a$ and/or $Y^b$ may be alcohol groups before reacting to form X—$Y^a$ and/or X—$Y^b$ urethane bonds. To result in X—$Y^a$ and/or X—$Y^b$ being urea bonds, X may be an isocyanate (—NCO) group and $Y^a$ and/or $Y^b$ may be amine groups before reacting to form X—$Y^a$ and/or X—$Y^b$ urea bonds. Notably, in each of the above instances, the term "reacting" is understood to include the appropriate conditions, as well known in the art, for X and $Y^a$/$Y^b$ to react to form the resulting X—$Y^a$ and/or X—$Y^b$ bond.

In another aspect, the present disclosure is directed to methods of producing an object made of the above-described crosslinked polymer by additive manufacturing (AM). In the AM process, the above-described crosslinked polymer is used as a feed material in an AM device. The AM process can employ any of the AM devices well known in the art, such as a rapid prototyping unit, or more particularly a fused deposition modeling (FFF) device, or more particularly, a 3D printer. As well known in the art, the additive process generally operates by mixing and extruding a material through a die or nozzle of a suitable shape and repeatedly depositing discrete amounts (e.g., beads) of a melted or otherwise extrudable form of the feed material in designated locations to build a structure. The AM process typically employs an elevated temperature to melt and extrude the feed material through the die or nozzle of the AM device. The crosslinked polymeric composition described herein is typically melted and extruded at a temperature of at least 100° C. In different embodiments, dependent on the polymer composition and degree of crosslinking, the crosslinked polymeric composition may be melted and extruded at a temperature of precisely or at least, for example, 100° C., 120° C., 150° C., 180° C., 200° C., 210° C., 220° C., 230° C., 240° C., 250° C., 260° C., 270° C., 280° C., 290° C., or 300° C., or a temperature within a range bounded by any two of the foregoing values, e.g., 150-250° C. or 180-250° C. In the FFF or 3D printing process, the nozzle is moved in precise horizontal and vertical positions as beads of the feed material are deposited to ultimately form a solid object. Upon exiting the die (i.e., nozzle) in the additive processing unit, the extrudate cools and solidifies (hardens). The beads of feed material are sequentially deposited to build an object, layer by layer. The nozzle movements and flow rate of the feed material are generally controlled by computer software, typically a computer-aided manufacturing (CAM) software package. The FFF or 3D printer builds an object (article) based on instructions provided by a computer program that includes precise specifications of the object to be constructed.

In some embodiments, the additive manufacturing process is a big area additive manufacturing (BAAM) process. As well known in the art, the BAAM process employs an unbounded open-air build space in which at least one, and typically, a multiplicity, of deposition heads controlled by one or a multiplicity of multi-axis robotic arms operate in concert to construct an object. In the BAAM process, the feed material is processed within and ultimately deposited from the deposition head layer-by-layer as an extrudate, which cools over time to produce the object. The BAAM process considered herein may use only the crosslinked polymeric material as feed for the entire BAAM process, or the BAAM process may employ the crosslinked polymeric material as feed in one or more deposition heads and may employ another feed composition in one or more other deposition heads to construct an object composed of different materials. As well known, the deposition head in a BAAM process is designed to combine melting, compounding, and extruding functions to produce and deposit an extrudate of the feed material layer-by-layer. The deposition heads are moved and precisely positioned by the multi-axis robotic arm, which can be either stationary or mounted on a multi-axis or conventional three-axis gantry system. The multi-axis robotic arms are, in turn, instructed by a computer program, as generally provided by a computer-aided manufacturing (CAM) software package. As also well known, in the BAAM process, one deposition head may be partly or solely responsible for building a specific region of the overall object, but generally coordinates with at least one other deposition head, which is involved in building another region of the overall object. The BAAM process is described in detail in, for example, C. Holshouser et al., *Advanced Materials & Processes*, 15-17, March 2013, and M. R. Talgani et al., *SAMPE Journal*, 51(4), 27-36, July/August 2015, the contents of which are herein incorporated by reference in their entirety.

The shape of the object that is ultimately built can be suited to any application in which a durable crosslinked material is desired. The shape of the object ultimately produced may be simple, e.g., a planar object, such as a film or coating of a desired two-dimensional shape (e.g., square or disc). Alternatively, the additive manufacturing process can be used to produce complex (i.e., intricate) shapes. Some examples of intricate shapes include rings, filled or unfilled tubes, filled or unfilled polygonal shapes having at least or more than four vertices, gears, and irregular (asymmetric) shapes.

Examples have been set forth below for the purpose of illustration and to describe certain specific embodiments of the invention. However, the scope of this invention is not to be in any way limited by the examples set forth herein.

EXAMPLES

Preparation and Analysis of ABS Crosslinked Vitrimer

The following experiments demonstrate a circular upcycling of a commodity plastic exemplified by ABS into a higher-performance vitrimer with full FFF-(re)processability in conventional printing conditions and robust printout properties comparable to crosslinked thermosets. A general schematic of the process is shown in FIG. 1B. The vitrimer exhibits mechanical robustness and chemical resistance by virtue of its covalent network, but it can also be malleable by reconfiguring reversible crosslinks through the associative bond exchange at elevated temperature, making it recyclable (FIG. 1A). An associative imine exchange was used in the design of the upcycled ABS-vitrimer system to make it directly (re)printable in typical FFF conditions.

The ABS-vitrimer was herein found to be significantly improved in thermomechanical and chemical robustness, while maintaining facile printability by FFF. The ABS vitrimer overcomes a major challenge of (re)printing crosslinked materials. It has also been found that the associative bond exchange between the vitrimer layers upon printing could improve the inherently weak inter-filament bonding and solvent-resistance of the FFF-printed structures without stepwise depolymerization-repolymerization or post-extrusion crosslinking. In addition, the ABS-vitrimer was found to be amenable to multi-path recyclability wherein the ABS-vitrimer wastes can be easily separated from mixtures with other plastics by dissolution or directly reprinted through FFF into useful 3D structures, and the dissolved unmodified ABS can be again upcycled to ABS-vitrimers (FIG. 1B). Thus, this value-enhancing cycle is expected to reduce the $CO_2$-equivalent emissions by at least 65% expected from simple dissolution-precipitation recycles compared to incineration (I. Vollmer et al., *Angewandte Chemie International Edition* 59, 15402-15423, 2020). The FFF of upcycled ABS-vitrimers introduces a readily adoptable approach to fulfill the intertwined thermomechanical-chemical-environmental needs for circular plastics manufacturing.

Synthesis of ABS-Vitrimers. The virgin or discarded ABS pellets were dissolved in a minimal amount of THF, then the butadiene segments were functionalized with amine groups via thiol-ene reaction by adding cysteamine of more than 5× the molar equivalent amount to ethylene fractions in ABS (18% measured by $^1$H NMR) and AIBN as the radical initiator of 0.5× molar equivalent to the ethylene fraction in ABS following the reported method (L. M. Campos et al., *Macromolecules*, 41, 7063-7070, 2008). The reaction proceeded at 60° C. for 18 hours or longer with continuous stirring. The reaction was halted by cooling the reaction mixture to room temperature, and then the THF was removed via rotary vaporization. The product was then purified by precipitating in ethanol three times. The precipitates were obtained by decanting and filtering, then dried under vacuum at room temperature overnight. The products were characterized with $^1$H NMR to quantify the amine-functionalized molar fraction (14 mol %). The products were then mixed with glutaraldehyde or acetoacetate (AcAc) crosslinkers with desired ratios (i.e. different [—CHO]/[—$NH_2$]) in THF. The reaction continued longer than 5 hours at room temperature under continuous stirring. Then, the solvent was removed by vacuum, and the crosslinked product was further cured in a vacuum oven at 150° C. for longer than 3 hours.

Synthesis of AcAc Crosslinkers. To test the generality of the above chemical upcycling pathway of producing ABS-vitrimer, two alternative crosslinkers were synthesized with acetylacetate (AcAc) functional groups for imine formation and dynamic exchange via transamination of vinylogous urethanes (W. Denissen et al., *Advanced Functional Materials*, 25, 2451-2457, 2015; W. Denissen et al., *Nature Communications*, 8, 14857, 2017) (i.e., aliphatic-AcAc, bisphenol-AcAc). Successful imine formation was confirmed from FTIR which showed the C=N stretching signals. The UTS of AcAc samples was also enhanced to the similar level reached by ALD-33, which demonstrates that the above synthetic path can indeed versatilely work with different crosslinkers to strengthen the ABS. The stability of the AcAc system was further tested in the solvents used for testing the ALD system, and it was confirmed that the AcAc systems likewise showed solvent-resistance. These results further supplement the thermoset features achieved by the general vitrimerization strategy described above using different crosslinkers.

Synthesis and Characterization of AcAc-Crosslinkers. Bisphenol Acetoacetate (Bisphenol-AcAc). Bisphenol A (22.8 g, 0.10 mol) and tert-butyl acetoacetate (79.0 g, 0.50 mol) were added to a 500 mL flask attached with a pressure tube. The mixture was heated for 4 hours at 150° C., and the tert-butanol product was continuously removed by distillation throughout the reaction. After the reaction was finished, the product was purified by column chromatography over silica gel using 2:0.1 methylene chloride/methanol as the eluent to afford a yellowish liquid (25 g, 63%).

Spectroscopic Characterizations. $^1$H-NMR spectra were recorded using a 400 MHz NMR spectrometer on the sample dissolved in THF-$d_8$ or $CDCl_3$ and analyzed with Bruker TopSpin software version 4.0.9 with the reference of THF-$d_8$ or $CDCl_3$ as the solvent. FTIR spectra were recorded with an FTIR spectrometer using the transmission mode on polymer film samples. $^{13}$C-NMR spectra were collected using a 700 MHZ 1H frequency using a 3.2 mm T3 triple resonance Varian probe. The spectra were collected using a standard echo experiment at 22.5 kHz magic angle spinning rate (srate) with 1H decoupling. The echo time was 1/srate. The spectra were collected with a recycle delay of 100 s with ~2000 scans.

Tensile Analysis. Tensile stress-strain curves were obtained by using a Universal Testing System with a 1 kN load-cell following the ASTM D1708 standard. Samples were prepared by hot pressing (0.7 ton) at 150° C. for 30 minutes to make a film followed by punching to cut the dog-bone films with a total length of 18 mm, gauged length of 7.0 mm, gauged width of 2.52 mm, and average thickness of 0.20 mm. The samples were tested at room temperature. Samples were elongated at the rate of 1 mm/second until failure. Toughness was calculated from the area under the stress-strain curve. The mechanical properties were reported from the average of at least three specimens for each sample.

Dynamic Mechanical Analysis (DMA). Dynamic mechanical properties analyses were carried out by using a film tension clamp. The same dog-bone films used in the tensile analysis were used for characterization. Samples were tested at temperatures ranging from 35 to 130° C. at a ramp rate of 3° C./minute, with a 1 Hz frequency and 20 µm amplitude.

Differential Scanning Calorimetry (DSC). Approximately 5 mg of samples were measured into standard sealed aluminum T-Zero pans. A heating cycle was then run from 25 to 200° C. at a heating rate of 10° C./min under nitrogen with a 5-minute isotherm at the maximum temperature and minimum temperature. The specimens were subjected to 3 heating cycles.

Thermogravimetric analysis (TGA). The TGA was performed for assessing the thermal decomposition. The ~10 mg of sample was prepared and run from room temperature to 800° C. at a heating rate of 10° C./min under nitrogen on a TA instrument.

Rheological Measurements. Rheological measurements were performed with a rheometer using 4 mm aluminum parallel-plate geometry. For frequency sweep and stress relaxation experiments, the samples were tested at temperatures of 130, 140, 150, 160, and 170° C. by applying a constant strain at 1%. The frequency sweep tests were performed at a 0.1-100 rad/second frequency range, then processed through time-temperature superposition to generate master curves at a reference temperature of 150° C. via commercial software by using the Williams-Landel-Ferry equation. The relaxation modulus G(t) (Pa) was recorded up to 1,000 seconds at a constant temperature. The relaxation times τ (s) were determined following the widely used custom to evaluate stress-relaxation of vitrimers as the time when G(t)/Gi became 1/e (~36.8%) from the Maxwell model (Eq. 1), where G (Pa) is the modulus at time 0.1 second when the strain was stabilized at the set value.

$$G(t) = G_i \exp\left(-\frac{t}{\tau}\right) \quad (1)$$

The creep test was performed at 130, 140, 150, and 160° C. at a constant stress of 50,000 Pa. Before each rheological measurement, the sample underwent thermal equilibration for 5 minutes. The temperature dependence of obtained τ was fitted with the following Arrhenius relation (Eq. 2):

$$\tau(T) = \tau_0 \exp\left(\frac{E_a}{RT}\right) \quad (2)$$

where τ(T) is the relaxation time (s) measured at temperature T (K), $\tau_0$ is the characteristic relaxation time at infinite temperature (s, Arrhenius pre-factor), $E_\alpha$ is the apparent activation energy (J/mol), and R is the ideal gas constant (J/mol·K).

Chemical Solvent-Resistance Test. The chemical resistance of the samples was tested by immersing each sample in more than 30 times the volume of acetone, THF, chloroform, DCM, or DMF at room temperature. The dissolution was visually observed and compared within 24 hours unless specified otherwise. When separating the ABS-vitrimer from unsorted plastic waste mixtures, THF was used to dissolve the dissolvable plastics followed by decanting the supernatant solution.

Fabrication of Polymer Filaments. The polymer filaments were produced and spooled by using a commercial extruder and spooler system. The polymer pellets or particles were fed into the hopper and extruded at 230° C. through a 1.75 mm die nozzle. The formed filament was wound onto a spool by using the spooler at ambient temperature. The extrusion and winding rates were adjusted to stably produce the 1.75-mm-thick filament wound onto a spool.

FFF 3D Printing. The FFF 3D printing was performed using a commercial 3D printer. The 1.75 mm polymer filaments were loaded into the filament feeder of the printer and continuously fed during printing. The polymer was extruded at 230° C., the typical extrusion temperature of ABS through a 0.5 mm hothead nozzle and deposited onto the hotbed stage. The hotbed stage temperature was 90-100° C. The printing infill pattern was designed to print single-layered tensile dog-bone specimens that were 0.2× size of ASTM D638 type I (i.e. full length of 33 mm, gauged width of 3.0 mm, grip width of 4 mm, thickness of 0.5 mm) in either transverse or longitudinal paths of printed layers. The corresponding G-Code was coded via commercial software and was used to print Neat-ABS and ABS-vitrimers. The deposited samples were carefully retrieved after 5 minutes without any post-modification. The 3D-printed tensile specimens were subjected to the aforementioned tensile test conditions. Likewise, the same G-codes and printing parameters for other printout structures were used to print Neat-ABS, ABS-vitrimer, or their mixtures.

Scanning Electron Microscopy (SEM). The surface morphological properties of 3D-printed samples were characterized by a focused ion beam—SEM system. All samples were sputter-coated with gold for 10 seconds before imaging, and images were obtained with an operating voltage of 5 kV.

Compression Test. The compression tests were performed at ambient conditions by using an electromechanical testing machine and a die-set fixture at a constant crosshead displacement rate of 20 μm/second. The compression specimens were printed in cuboid structure (width×length×thickness: 15.5×15.5×5-7 mm, 1.0-1.5 g) with cross-sectional geometry inspired by the honeycomb structures of beetles' forewings. The specific energy absorption (SEA) that estimates the ability of a unit mass of a material to dissipate crushing energy through plastic deformation is defined as follows (Eq. 3):

$$SEA = \int_0^{d_{max}} \frac{F(x)}{m} dx \quad (3)$$

where m is the mass of the energy-absorbing material (g), F(x) is the compressive force (i.e., load [kN]) at the displacement x (mm), and $d_{max}$ is the maximum displacement (mm) before material densification where the slope of F(x) surges at a later stage.

Results and Discussion

The presently described strategy used a one-step modification to upcycle the ABS to an FFF-printable vitrimer. In ABS, rubbery butadiene segments provide ductility and toughness and also provide the unsaturated double bonds amenable for post-functionalization. Thiol-ene 'click' chemistry (A. B. Lowe, Polym. Chem., 5, 4820-4870, 2014) was herein used to functionalize butadiene segments with cysteamine, followed by reacting with a short-chain dialdehyde (i.e. glutaraldehyde) to produce the ABS-vitrimer.

Figure 2C:
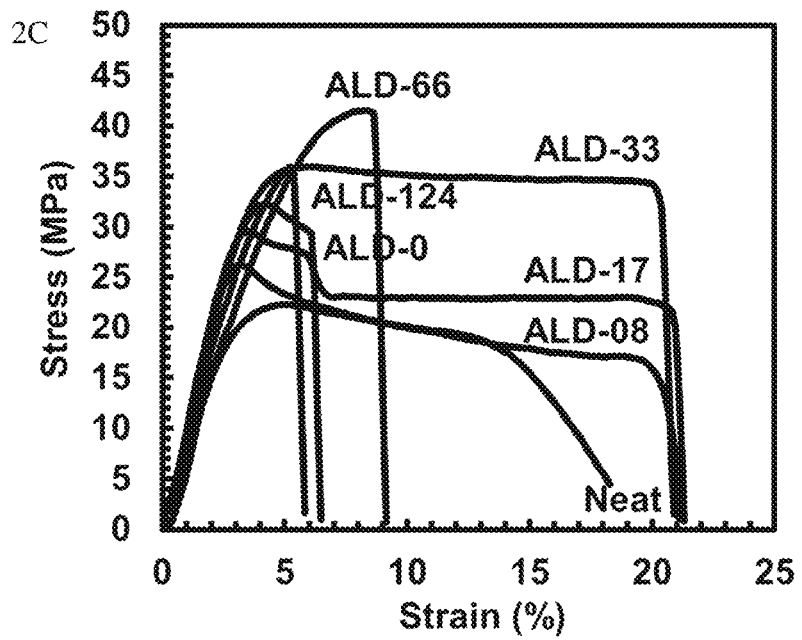
FIG. 2C is a graph containing tensile stress-strain curves of Neat, ALD-0, ALD-08, ALD-17, ALD-33, ALD-66, and ALD-124.

In this work, the virgin ABS ([A]:[B]:[S]=18:18:64 mol %) or its discarded waste was modified with primary amine groups via the thiol-ene click reaction of cysteamine on butadiene groups in ABS. A general schematic of the process is shown in FIG. 2A). As shown at the bottom of FIG. 2A, the reaction mixture visibly turned from a colorless solution into a pale lime-yellow solution. The $^1$H nuclear magnetic resonance (NMR) results confirmed that the original 18 mol % of butadiene segments in ABS were reduced to 4 mol %, along with the corresponding increase of aminoethyl thioether, which indicates that about 14 mol % of the segments became attached to the cysteamine and thus functionalized with primary amines.

Subsequently, the amine-modified ABS underwent imine formation by reacting it with the glutaraldehyde crosslinker in varied ratios (i.e. indicated by ALD-XX, where XX %=[—CHO]/[—NH$_2$]). A general schematic of the process is shown in FIG. 2B. The reaction mixture turned orange-pink in different saturations according to aldehyde concentrations, followed by curing at 150° C. for further transimination. The imine crosslinking was confirmed by Fourier-transform infrared (FTIR) spectroscopy, solid-state $^{13}$C NMR, and solvent-resistance in multiple solvents, including THF, acetone, chloroform, dichloromethane, and dimethylformamide. The change of $T_g$ (~118±1° C.) or thermal stability upon crosslinking was insignificant, which indicates the preservation of thermal processability of ABS.

Figure 2D:
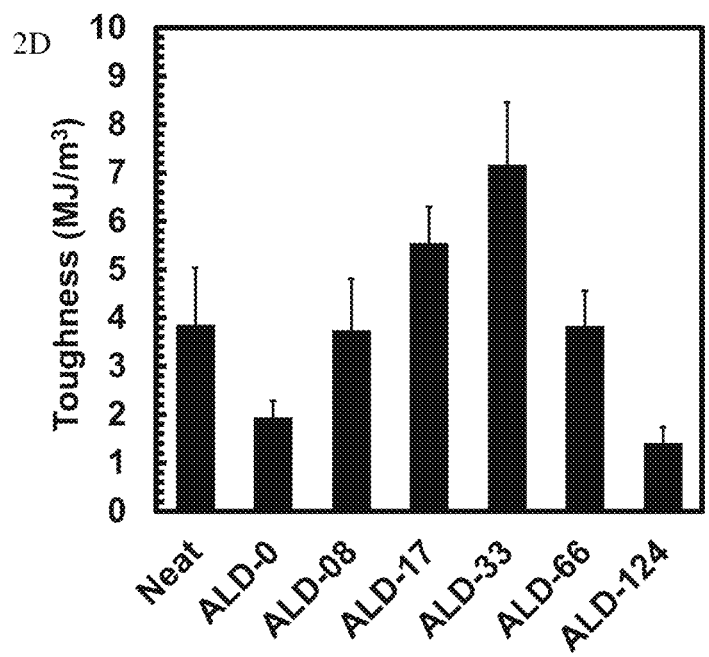
FIGS. 2D and 2E are graphs showing comparison of toughness (FIG. 2D, wherein inset is a photo of synthesized ALD-08, ALD-17, and ALD-33 samples with different color saturations), and UTS (FIG. 2E) of the specimens in (C). The error bars indicate standard deviations from at least triplicate measurements.

Mechanical properties of ALD-0, ALD-08, ALD-17, ALD-33, ALD-66, and ALD-124 were assessed by tensile tests and compared with untreated ABS (Neat-ABS). The results of the tensile tests are shown in the graph in FIG. 2C. The functionalization of ductile butadiene segments via the thiol-ene reaction reduced the overall toughness of ABS, as seen from ALD-0 curve. Adjusting the fraction of ALD crosslinkers (ALD-08, ALD-17, and ALD-33) controllably improved the strength and toughness, likely because the partial crosslinking connected individual chains to increase effective overall polymer chain structures responding to the external force, which allows chains to be held together longer upon crazing against tensile fracture. Compared with the ~3.8 MJ/m$^3$ toughness and ~25 MPa ultimate tensile strength (UTS) of the Neat-ABS, the ALD-33 nearly doubled the toughness to ~7.2 MJ/m$^3$ and increased the UTS by 54% to ~38 MPa. The foregoing results are shown graphically in FIG. 2D (toughness results) and FIG. 2E (UTS results). When the network was crosslinked with excessive crosslinkers (i.e. ALD-124), the plasticity was lost, which implies that the chain movement beyond the elastic regime was restricted by denser covalent crosslinks. The UTS of ALD-66 reached~44 MPa, which is a greater than 80% increase from the Neat-ABS, but the trade-off in deformability was likewise attributed to the denser network. Thus, ALD-33 was selected as the primary formulation to represent the imine-crosslinked system for printing and other investigations because toughness and ductility are desirable for fracture-free pre-printing steps and printout properties.

Figure 3A:
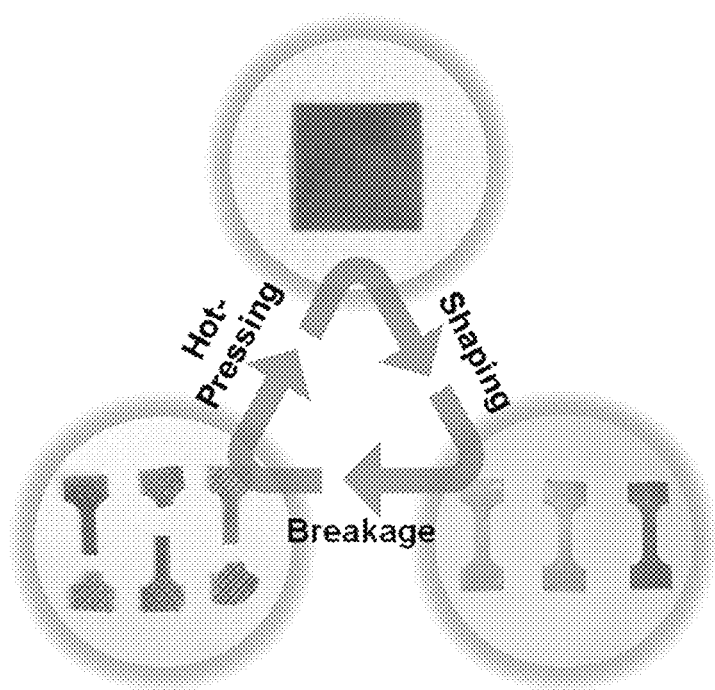
FIGS. 3A-3E. Processability and viscoelastic behavior of ABS-vitrimer.
Figure 3B:
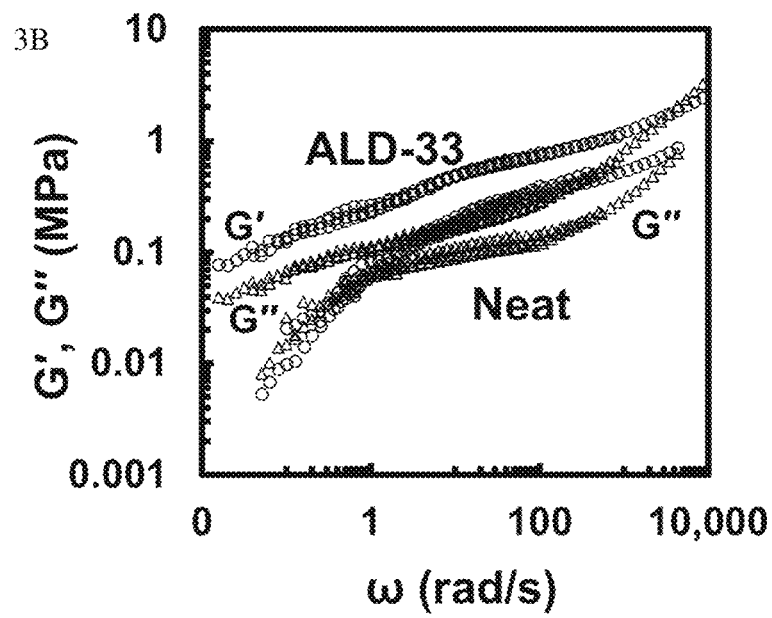
Figure 3C:
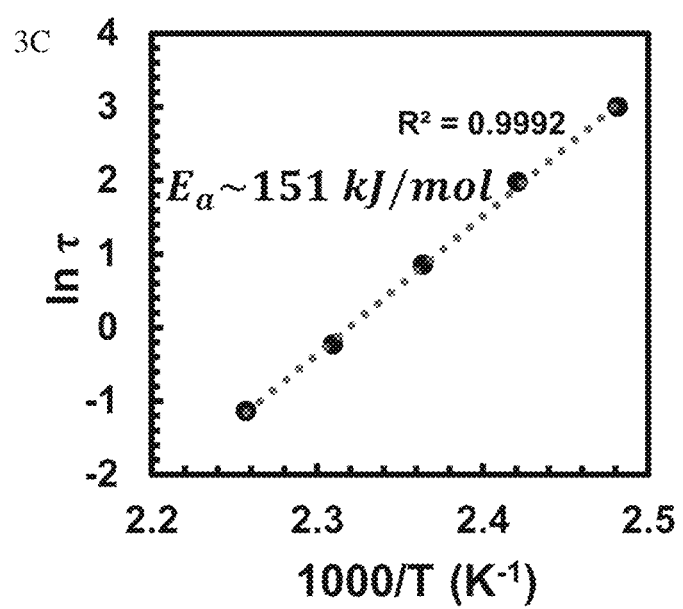

The viscoelastic properties and processabilities were examined at temperatures higher than $T_g$ by rheometry on hot-pressed vitrimer films as shown in FIG. 3A. The rheological master curve (FIG. 3B) shows that ALD-33 exhibits more solid-like behavior evidenced by twofold higher G' (storage modulus) and slower terminal relaxation than Neat-ABS at $\omega \approx 4$ rad/second. Additionally, the stress-relaxation test was performed to find relaxation times ($\tau$) and their Arrhenius behavior, which is widely reported for vitrimers. Within 100 s, the $\tau$ of ALD-33 could be determined for all measured temperatures, and complete relaxation was observed at 170° C. within 1,000 seconds, which indicates that crosslinks in the network were exchangeable. The temperature-dependence of $\tau$ for ALD-33 showed good agreement with the Arrhenius law (FIG. 3C), resulting in $E_a \approx 151$ kJ/mol, which is consistent with a previously reported value (~157 kJ/mol) for polyimine vitrimers (P. Taynton et al., *Advanced Materials*, 26, 3938-3942, 2014). In contrast, the Neat-ABS poorly followed the Arrhenius equation, and its obtained $\tau$ was consistently shorter than that of ALD-33 in all measured temperatures. Creep tests further demonstrated superior thermomechanical stability and Arrhenius behavior of the ABS-vitrimer. Based on these results, the hypothetical topology freezing transition temperature ($T_v$) was estimated to be ~54° C. (C. A. Angell, *Science*, 267, 1924-1935, 1995). The $T_v$ is considered as the temperature above which the dynamic exchange can occur and can be estimated from the extrapolation of the Arrhenius plot (Y. Yang et al., *Nature Communications*, 10, 2019). Therefore, the dynamic trans-imination should readily occur in the tested temperature range of 130-170° C. The $E_a$ of ALD-33 (~151 kJ/mol) is high among reported vitrimer systems (B. R. Elling et al., *ACS Cent. Sci.*, 6, 1488-1496, 2020), which indicates that the system becomes rapidly dynamic upon temperature increase towards the extrusion temperature of ~230° C. to facilitate processing, while improving thermomechanical stability near $T_g$.

Figure 3D:
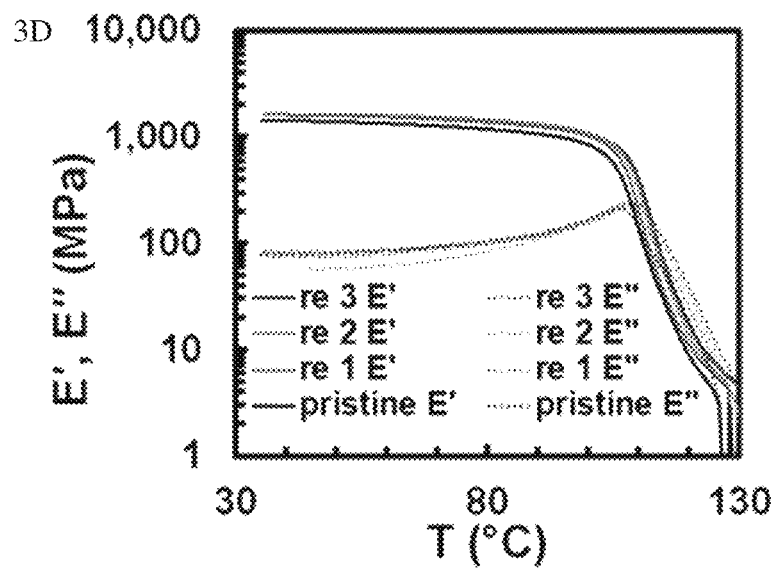
Figure 3E:
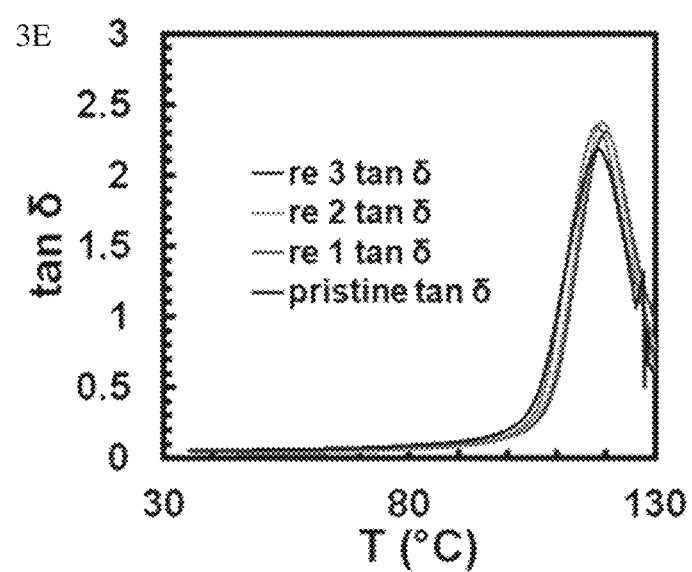

The recyclability of ALD-33 was evaluated using DMA (FIGS. 3D and 3E) and tensile tests on samples fractured from the pristine film, then repressed at 150° C. to reproduce the film up to three cycles (re 1-3) (FIG. 3A). The DMA profiles of the four samples showed nearly identical storage moduli (E') upon three recycles, indicating a good recovery of its elasticity (FIG. 3D). Correspondingly, the $T_g$ determined by the DMA tan $\delta$ peak showed insignificant change throughout three recycles, confirming no considerable alteration in elasticity and processability (FIG. 3E). The tensile tests on these samples also displayed a good recovery of the UTS and ductility. This conservation of network elasticity suggests that the dynamic covalent crosslinks were restorable during reprocessing cycles. Thus, the observed re-processability proves that the crosslinked ABS-vitrimer can be recycled by reheating without solvents or additives to dissociate the network, which permits (re)printability by heating in FFF protocols.

The key to the direct FFF printability of vitrimer is imparting fast exchange kinetics and malleability with mechanical integrity for self-standing structure during printing. The present work established a system (i.e. ALD-33) with a good balance between strength and deformability (FIGS. 2C to 2E), and importantly, the free —NH$_2$ groups sufficiently available for facile imine bond exchange with crosslinkers (FIGS. 2B to 2E, 3B, and 3C). The $\tau$ of ALD-33 approaches that of Neat-ABS above 170° C. and becomes as short as 0.002 seconds at the typical ABS-printing temperature of 230° C. (extrapolated from Arrhenius plot in FIG. 3C).

Figure 2E:
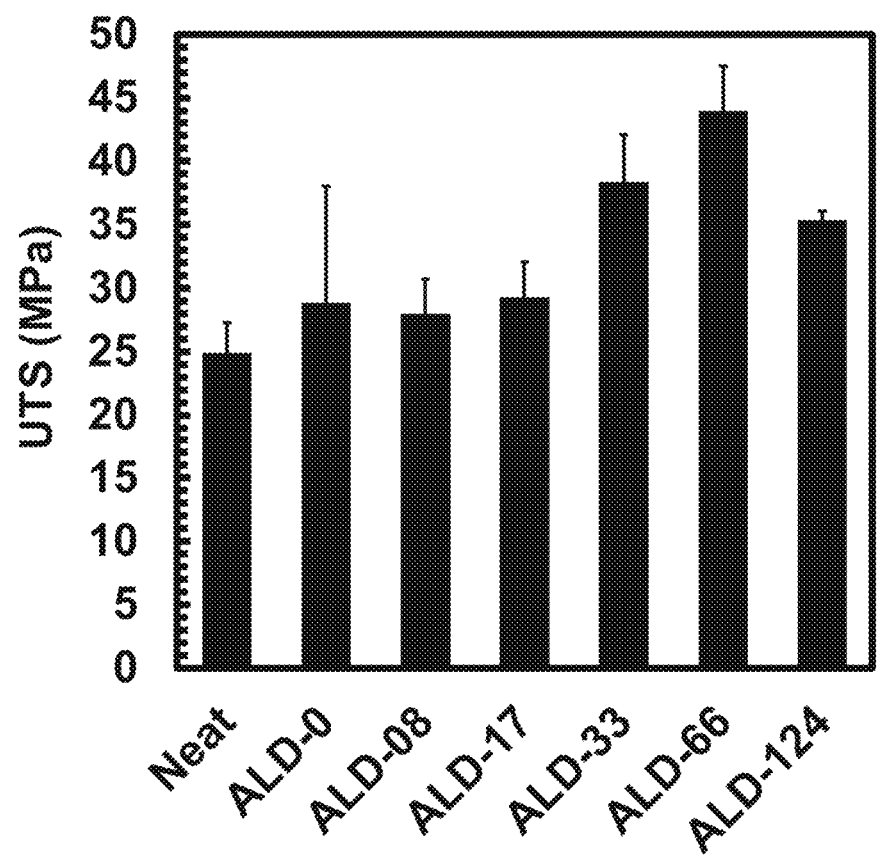

Based on such fast bond exchange and good processability, the ABS-vitrimer was successfully printed in common FFF protocols for Neat-ABS involving the feedstock filament extrusion, loading, feeding, and printing without any post-processing. Dog-bone specimens were printed with transverse (FIGS. 4A-4C) and longitudinal (FIGS. 4D-4F) infill patterns. The tensile strength of transverse-printed specimens thus represents the interlayer strength because layer joints intrinsically make topological valleys where tensile stress concentrates (S. H. Ahn et al., *Rapid Prototyping Journal*, 8, 248-257, 2002). The ALD-33 exhibits~1.6 times higher strength in both printing patterns. Notably, the interlayer strength of Neat-ABS (~15 MPa) improved to ~25 MPa in ALD-33 by incorporating the dynamic imine bonds (FIGS. 4B and 4C), which is a similar value to the original UTS of Neat-ABS films (FIG. 2E).

Figures 4A, 4B, 4C, 4D, 4E, 4F, 4G:
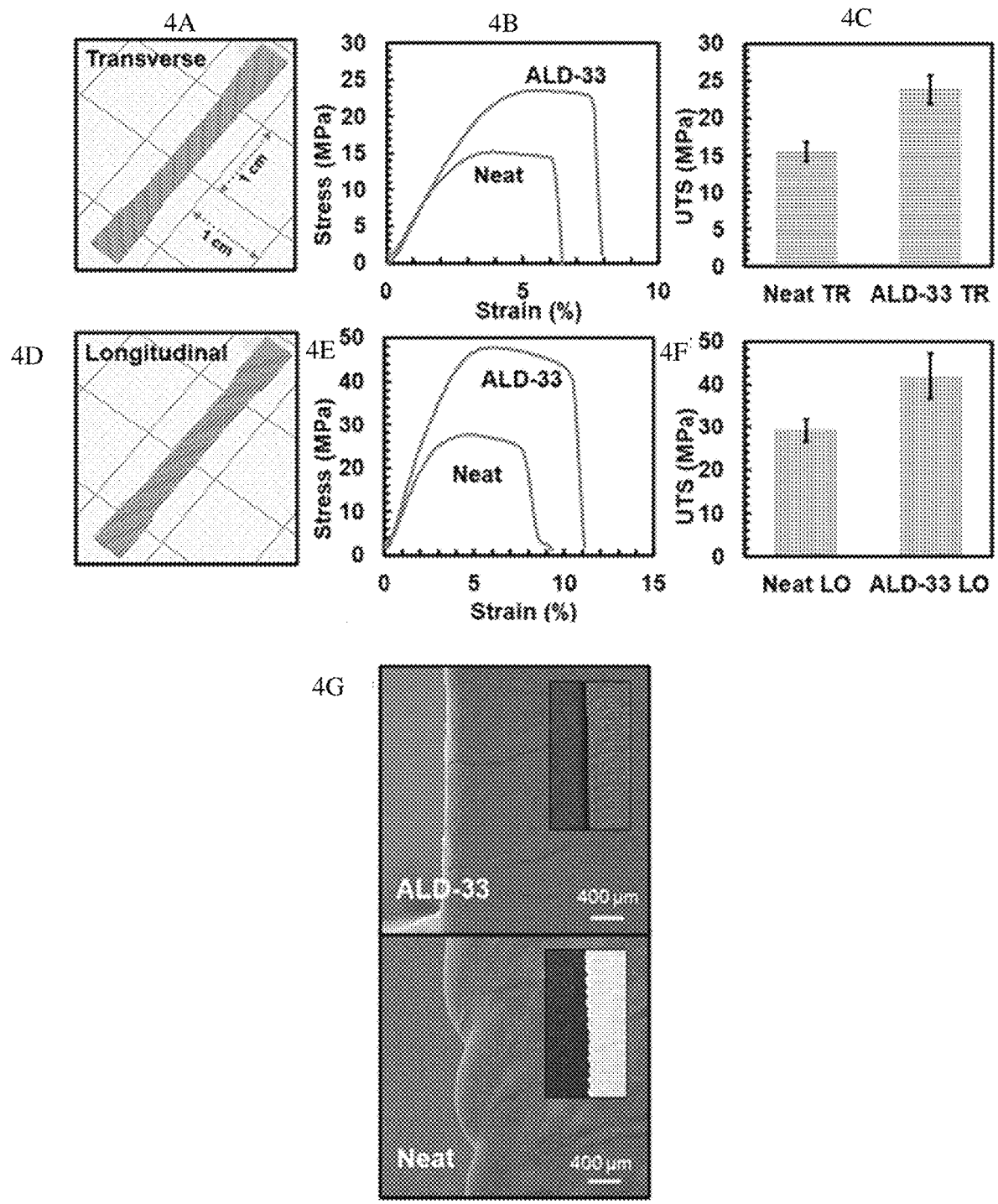
Figures 4H, 4I, 4J:
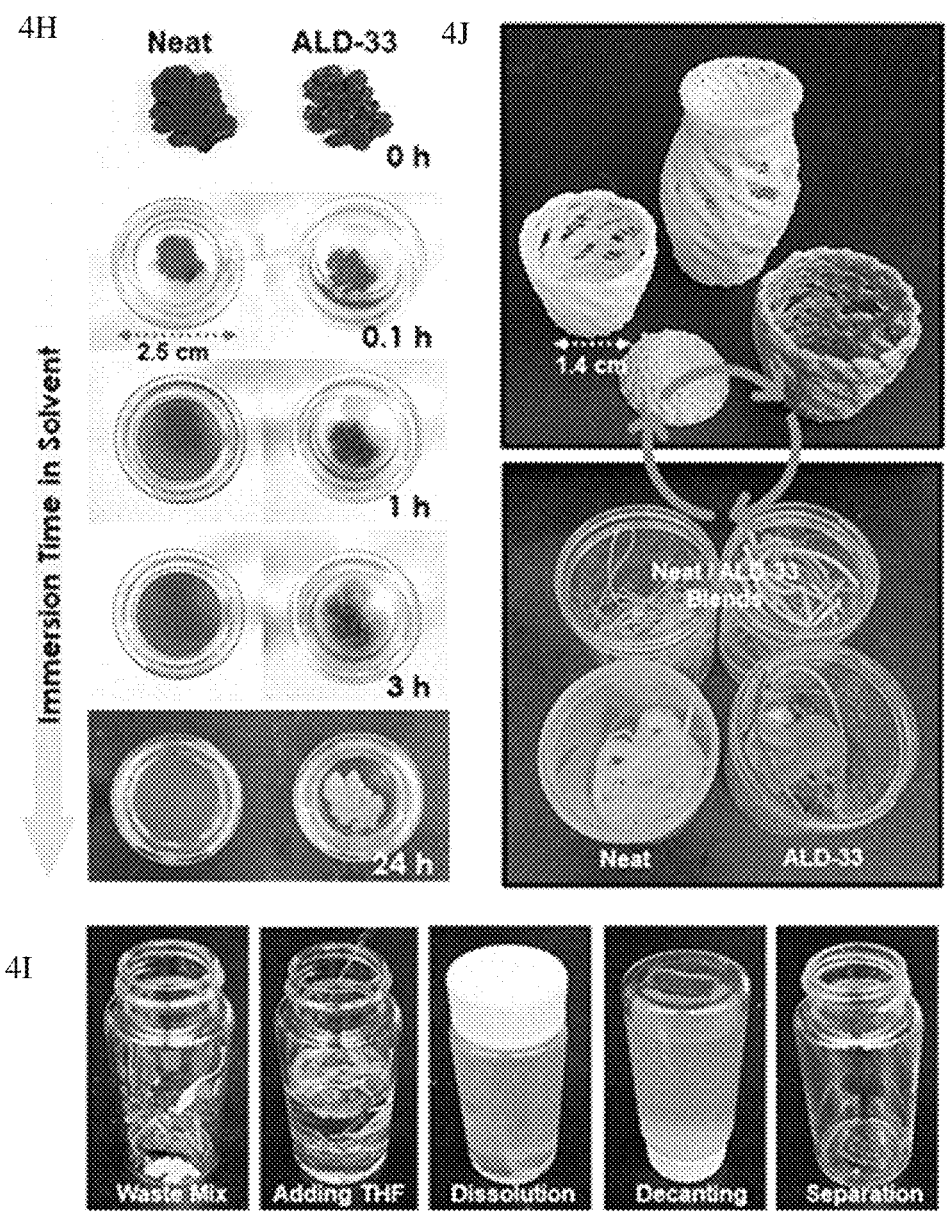

Furthermore, the transverse-printed part of ALD-33 visibly showed better interlayer integration as indicated by smoother edge and interlayer joints, whereas the Neat-ABS printout displayed curvatures at the edge by the printing path and sharp topological valleys at the interlayer joint (FIG. 4G). Thus, dynamic crosslinking in the ABS-vitrimer without post-processing creates strong inter-filament interfaces, which is typically limited to 3D printing of thermosets with post-extrusion crosslinking (K. Yang et al., *Advanced Functional Materials*, 27, 1700318, 2017). Furthermore, the option to post-anneal the vitrimer samples is also available to further enhance the interlayer strength or reduce scratches on surfaces. The solvent-resistance of specimens immersed in THF was also examined to corroborate the crosslinking throughout the layered structure (FIG. 4H). Despite some swelling, the ABS-vitrimer maintained the printed structure well and exhibited insignificant mass loss, whereas the Neat-ABS disintegrated within 1 hour. These observations in solvent-stability thereby support the concept that interlayer covalent bonds preserve the layered structure to resist disintegration. Moreover, this solvent-resistance permits easy separation of ABS-vitrimer from its waste mixtures with Neat-ABS or other soluble plastics (e.g., Styrofoam) via a simple dissolution-decanting procedure (FIG. 4I). Thus, ABS-vitrimer can be separated and readily recycled, and dissolved Neat-ABS waste can be again upcycled to ABS-vitrimer (FIGS. 1 and 2). Alternatively, the ABS-vitrimer can also be decrosslinked and dissolved on demand by adding an excess amount of monofunctional amines (e.g., octylamine), which provides another possible solution-based separation path.

Furthermore, as shown in FIG. 4J, even when mixed with Neat-ABS, the used ABS-vitrimer can be directly reprinted using the same printing protocols. The discarded ABS-vitrimer wastes were fragmented into extruder-feedable sizes, then extruded into recycled filaments. The vitrimer wastes can be mixed with Neat-ABS wastes to form blends to control the amount and color of printouts. The reusability and compatibility of ABS-vitrimer with Neat-ABS, as shown above, thus demonstrates that wastes of Neat-ABS, ABS-vitrimer, and unsorted mixtures produced during any step can be upcycled into useful and complex 3D structures difficult to obtain using conventional molding or casting methods, such as baskets shown in FIG. 4J, instead of being discarded.

The short timescale of bond rearrangements ($\tau$), high $E_a$, and deformability obtained from the rational network design makes the crosslinked ABS-vitrimer (re)printable and quickly develop interlayer bonding upon deposition of melts. These parameters can serve as useful evaluators for implementing the direct FFF-(re)printability to other existing upcycled vitrimers. For example, compared with a previously reported epoxy-vitrimer (A. R. De Luzuriaga et al., *Materials Horizons*, 3, 241-247, 2016), ABS-vitrimer has ~1000 times shorter $\tau$, ~3 times greater $E_a$ and deformability for direct FFF-(re)processing/printing and in-situ interlayer integration. Thus, upcycling ABS or other commodity thermoplastics to FFF-(re)printable vitrimers can be achieved by tuning these design parameters to simulate the thermomechanical properties of the untreated thermoplastics. Although it is difficult to find examples of direct FFF of vitrimer comparable to engineering plastics, ~40 MPa UTS of the ABS-vitrimer exceeds those of vitrimers applied in different extrusion-based AM, such as DIW (Q. Shi et al., *Materials Horizons*, 4, 598-607, 2017).

Figures 4K, 4L, 4M:
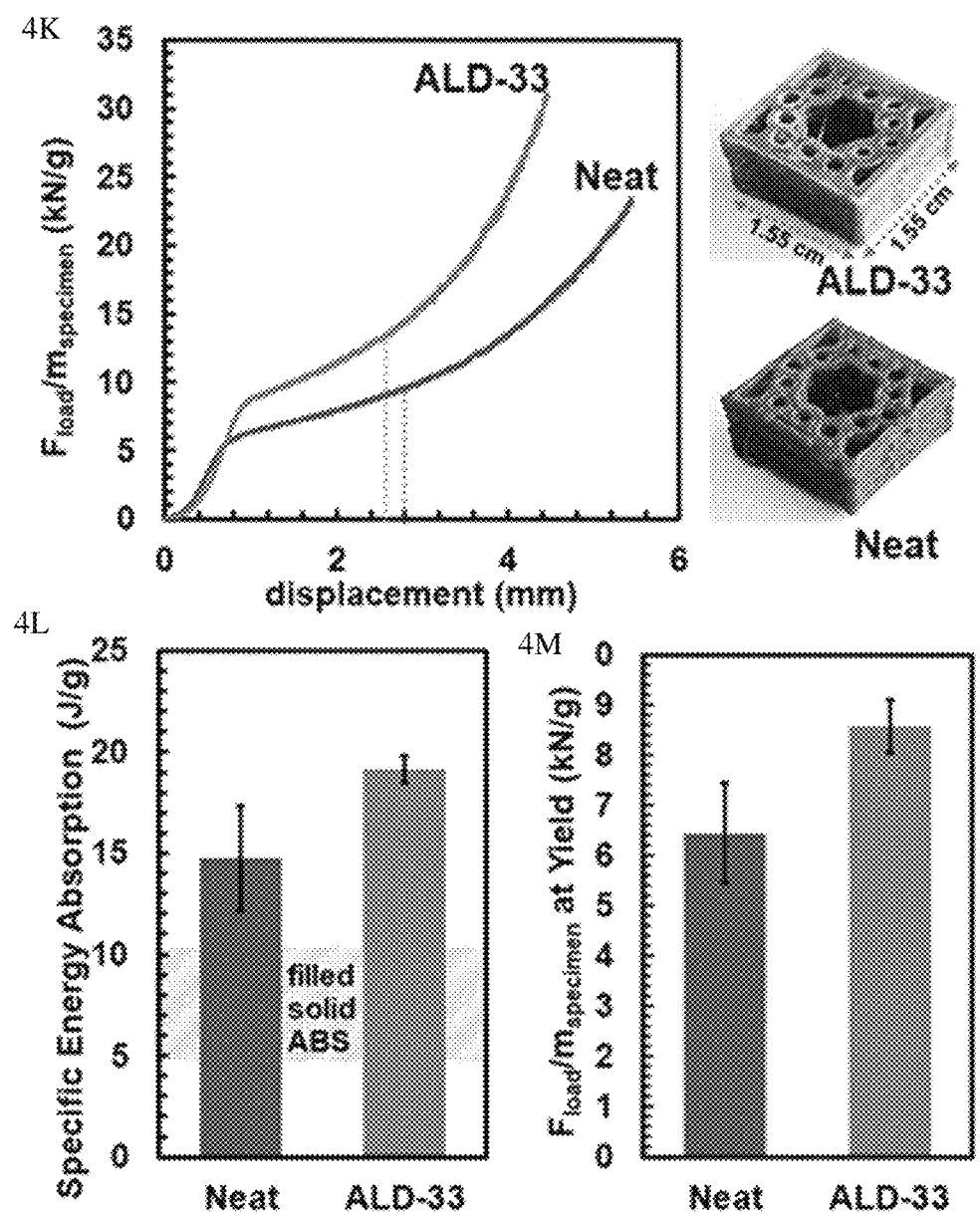

Another advantage of ABS-vitrimer FFF resides in the realization of intricate 3D geometries with superior structural mechanical properties. For example, bioinspired honeycomb structures of beetles' forewings, which are known for their excellent compressive properties, were facilely printed by FFF of ABS and ABS-vitrimer (FIG. 4K). The beetle-inspired ABS-vitrimer printout withheld higher load and absorbed more energy upon deformation (i.e. specific energy absorption, SEA) than the Neat-ABS. Notably, the SEA of ABS-vitrimer printout reached values as high as those of epoxy composites with chopped carbon fibers, which is three-fold greater than those reported for filled structures of unmodified ABS (FIGS. 4K to 4M (G. C. Jacob et al., *Polymer Journal*, 35, 560-567, 2003). The superior SEA obtained by bioinspired printing of upcycled ABS-vitrimer, therefore, indicates a path to achieve enhanced structural strength with significantly reduced material consumption compared with traditional manufacturing routes.

Finally, the present work assessed the generality of the above-described upcycling pathway of ABS-vitrimer using alternative crosslinkers of acetylacetate (AcAc) functional groups to form vinylogous urethanes by dynamic transamination. Notably, the UTS and solvent-resistance were enhanced to a similar level reached by ALD-33, which demonstrates that the synthetic approach described above can be versatilely applied to different crosslinking paths to enhance mechanical and chemical robustness. As exemplified by the AcAc systems, the thiol-ene click modification strategy for developing vitrimers can be greatly expanded to different base polymers with alkene groups, branching molecules, and crosslinkers with diverse length, structure, and exchange groups to control material properties. This work thus provides a platform for developing other FFF-printable vitrimer and vitrimer composites for foreseeable applications ranging from electronics, vehicles, robotics to biomedical therapeutics.

The findings here offer an opening model to upcycle plastic wastes into elaborate 3D-printed structures of robust, recyclable crosslinked materials. The approach should be especially applicable to various currently printable commodity thermoplastics. The facile upcycling from existing commodity thermoplastics and the manufacturability of complex objects, such as beetle-inspired structures, can be integrated with multiple value-enhancing circular models. The design and evaluation of the ABS-vitrimer for the full FFF printing shared in this work presents a tangible example to benchmark and apply FFF-printability without modifying approachable printing protocols and conditions to the broad range of existing or future vitrimer materials. The approach of upcycling commodity plastics into materials with higher-value structures and properties through an accessible AM technique provides an imminently adoptable and pragmatic strategy toward establishing closed-loop circular manufacturing.

While there have been shown and described what are at present considered the preferred embodiments of the invention, those skilled in the art may make various changes and modifications which remain within the scope of the invention defined by the appended claims.

What is claimed is:

1. A crosslinked polymeric composition comprising a base polymer containing unconjugated carbon-carbon double bonds of the formula —$CR^a$=$CR^b$—, wherein a portion of said unconjugated carbon-carbon double bonds in said base polymer are interconnected by a crosslinker (L) as shown in the following structure:

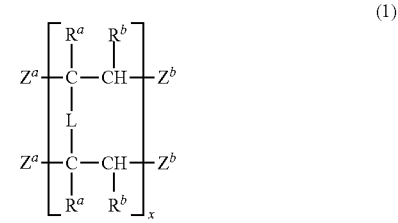

wherein:
$R^a$ and $R^b$ are independently selected from hydrogen atom and hydrocarbon groups containing at least one carbon atom, wherein, in the case where $R^a$ and $R^b$ are both hydrocarbon groups, said hydrocarbon groups optionally interconnect to form a ring;
2x represents the molar percentage of segments that are linked with the linker L throughout the crosslinked polymeric composition;
L is a crosslinker having the formula: —S—$R^1$-$L^a$-R2-$L^b$-$R^1$—S—;
$R^1$ and $R^2$ are independently selected from hydrocarbon linking groups containing at least one carbon atom;
$L^a$ and $L^b$ independently represent dynamic reversible crosslinking groups independently selected from the group consisting of imine (—C=N—) bonds, disulfide bonds, carboxy ester bonds, urea bonds, silyl ether bonds, vinylogous urethane, and urethane bonds; and $Z^a$ and $Z^b$ independently represent remaining portions of the base polymer.

2. The crosslinked polymeric composition of claim 1, wherein the base polymer is selected from the group consisting of acrylonitrile-butadiene-styrene, styrene-butadiene-styrene, styrene-butadiene, acrylonitrile-butadiene, polybutadiene, polyisoprene, polynorbornene, and poly(aryl glycidyl ether) polymers.

3. The crosslinked polymeric composition of claim 1, wherein the base polymer contains a polybutadiene block.

4. The crosslinked polymeric composition of claim 3, wherein the crosslinked polymer composition has the following structure:

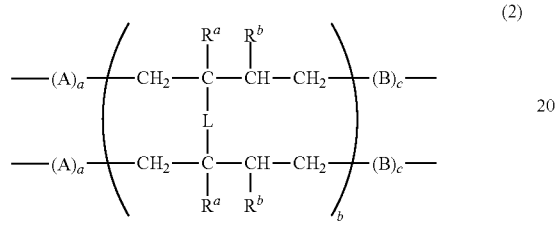

(2)

wherein:
$R^a$ and $R^b$ are independently selected from hydrogen atom and hydrocarbon groups containing at least one carbon atom, wherein, in the case where $R^a$ and $R^b$ are both hydrocarbon groups, said hydrocarbon groups optionally interconnect to form a ring;
L is a crosslinker having the formula: —S—$R^1$-$L^a$-$R^2$-$L^b$-$R^1$—S—;
$R^1$ and $R^2$ are independently selected from hydrocarbon linking groups containing at least one carbon atom;
$L^a$ and $L^b$ independently represent dynamic reversible crosslinking groups independently selected from the group consisting of imine (—C=N—) bonds, disulfide bonds, carboxy ester bonds, urea bonds, silyl ether bonds, vinylogous urethane, and urethane bonds;
2b corresponds to the molar percentage of butadiene units in the polymer and is an integer of at least 1;
A and B represent other polymerized units; and
subscripts a and c independently represent an integer of at least 1.

5. The crosslinked polymeric composition of claim 3, wherein the base polymer is selected from the group consisting of acrylonitrile-butadiene-styrene, styrene-butadiene, acrylonitrile-butadiene, and polybutadiene.

6. A method of producing a crosslinked polymeric composition comprising:
(i) providing a base polymer containing unconjugated carbon-carbon double bonds of the formula —$CR^a$=$CR^b$—, wherein $R^a$ and $R^b$ are independently selected from hydrogen atom and hydrocarbon groups containing at least one carbon atom, wherein, in the case where $R^a$ and $R^b$ are both hydrocarbon groups, said hydrocarbon groups optionally interconnect to form a ring;
(ii) reacting a portion of said unconjugated carbon-carbon double bonds with thiol-containing molecules of the formula HS—$R^1$—X under conditions that promote a thiol-ene reaction, wherein $R^1$ is a hydrocarbon linking group containing at least one carbon atom and X is a crosslinkable reactive group, to form the following intermediate (a):

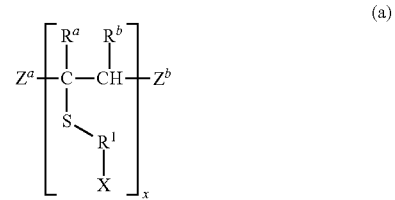

(a)

wherein $Z^a$ and $Z^b$ independently represent remaining portions of the base polymer and x represents the molar percentage of segments that are attached to —S—$R^1$—X throughout the base polymer; and (iii) crosslinking between X groups of intermediate (a) species with a crosslinker of the formula $Y^a$—$R^2$—$Y^b$, wherein $R^2$ is a hydrocarbon linking group containing at least one carbon atom and $Y^a$ and $Y^b$ are reactive with X to result in the following structure:

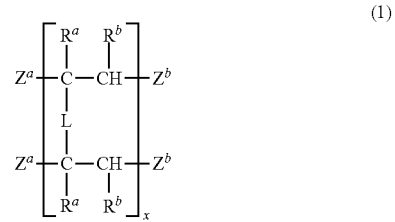

(1)

wherein L has the formula —S—$R^1$—X—$Y^a$—$R^2$—$Y^b$—X—$R^1$—S—;
2x represents the molar percentage of segments that are linked with the linker L throughout the crosslinked polymeric composition;
$R^2$ is a hydrocarbon linking group containing at least one carbon atom;
X—$Y^a$ represents a dynamic reversible crosslinking group resulting from a reaction between a reactive group X and reactive group $Y^a$;
X—$Y^b$ represents a dynamic reversible crosslinking group resulting from a reaction between a reactive group X and reactive group $Y^b$; and
wherein X—$Y^a$ and X—$Y^b$ independently represent dynamic reversible crosslinking groups independently selected from the group consisting of imine (—C=N—) bonds, disulfide bonds, carboxy ester bonds, urea bonds, silyl ether bonds, vinylogous urethane, and urethane bonds.

7. The method of claim 6, wherein the base polymer is selected from the group consisting of acrylonitrile-butadiene-styrene, styrene-butadiene-styrene, styrene-butadiene, acrylonitrile-butadiene, polybutadiene, trans-polyisoprene, polynorbornene, and poly(aryl glycidyl ether) polymers.

8. The method of claim 6, wherein the base polymer contains a polybutadiene block.

9. The method of claim 8, wherein the base polymer is selected from the group consisting of acrylonitrile-butadiene-styrene (ABS), styrene-butadiene-styrene, styrene-butadiene, acrylonitrile-butadiene, and polybutadiene.

10. The method of claim 6, wherein X—$Y^a$ and X—$Y^b$ are imine (—C=N—) bonds.

11. The method of claim 6, wherein the base polymer is waste polymer.

12. The method of claim 11, wherein the waste polymer is waste ABS.

13. A method of producing an object by additive manufacturing, the method comprising:
(i) incorporating a crosslinked polymer feed material into an additive manufacturing device; and
(ii) melting and extruding the crosslinked polymer feed material through a die of the additive manufacturing device and repeatedly depositing discrete amounts of a melted form of the crosslinked polymer feed material through the die to build a solid object layer-by-layer, and permitting the layers to cool and harden to form a solid object constructed of the crosslinked polymer feed material;
wherein the crosslinked polymer feed material comprises a base polymer containing unconjugated carbon-carbon double bonds of the formula —$CR^a$=$CR^b$—, wherein a portion of said unconjugated carbon-carbon double bonds in said base polymer are interconnected by a crosslinker (L) as shown in the following structure:

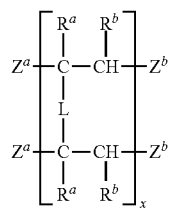

(1)

wherein:
$R^a$ and $R^b$ are independently selected from hydrogen atom and hydrocarbon groups containing 1-6 carbon atoms, wherein, in the case where $R^a$ and $R^b$ are both hydrocarbon groups, said hydrocarbon groups optionally interconnect to form a ring;
2x represents the molar percentage of segments that are linked with the linker L throughout the crosslinked polymeric composition;
L is a crosslinker having the formula: —S—$R^1$-$L^a$-$R^2$-$L^b$-$R^1$—S—;
$R^1$ and $R^2$ are independently selected from hydrocarbon linking groups containing at least one carbon atom;
$L^a$ and $L^b$ independently represent dynamic reversible crosslinking groups independently selected from the group consisting of imine (—C=N—) bonds, disulfide bonds, carboxy ester bonds, urea bonds, silyl ether bonds, vinylogous urethane, and urethane bonds; and
$Z^a$ and $Z^b$ independently represent remaining portions of the base polymer.

14. The method of claim 13, wherein the base polymer is selected from the group consisting of acrylonitrile-butadiene-styrene, styrene-butadiene-styrene, styrene-butadiene, acrylonitrile-butadiene, polybutadiene, polyisoprene, polynorbornene, and poly(aryl glycidyl ether) polymers.

15. The method of claim 14, wherein the base polymer contains a polybutadiene block.

16. The method of claim 15, wherein the crosslinked polymer feed material has the following structure:

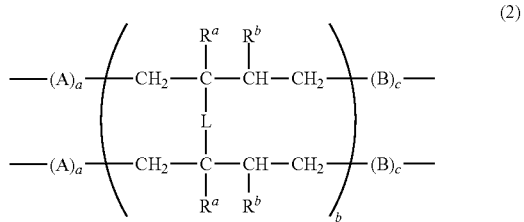

(2)

wherein:
$R^a$ and $R^b$ are independently selected from hydrogen atom and hydrocarbon groups containing at least one carbon atom, wherein, in the case where $R^a$ and $R^b$ are both hydrocarbon groups, said hydrocarbon groups optionally interconnect to form a ring:
L is a crosslinker having the formula: —S—$R^1$-$L^a$-$R^2$-$L^b$-$R^1$—S—;
$R^1$ and $R^2$ are independently selected from hydrocarbon linking groups containing at least one carbon atom;
$L^a$ and $L^b$ independently represent dynamic reversible crosslinking groups independently selected from the group consisting of imine (—C=N—) bonds, disulfide bonds, carboxy ester bonds, urea bonds, silyl ether bonds, vinylogous urethane, and urethane bonds:
subscript b corresponds to the molar percentage of butadiene units in the polybutadiene block and is an integer of at least 1;
A and B represent other polymerized units; and
subscripts a and c independently represent an integer of at least 1.

17. The method of claim 15, wherein the base polymer is selected from the group consisting of acrylonitrile-butadiene-styrene (ABS), styrene-butadiene-styrene, styrene-butadiene, acrylonitrile-butadiene, and polybutadiene.

18. The method of claim 13, wherein $L^a$ and $L^b$ are imine (—C=N—) bonds.

* * * * *